US010482761B2

(12) United States Patent
Dorum

(10) Patent No.: US 10,482,761 B2
(45) Date of Patent: Nov. 19, 2019

(54) LANE-LEVEL GEOMETRY AND TRAFFIC INFORMATION

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/956,316

(22) Filed: Apr. 18, 2018

(65) Prior Publication Data

US 2019/0325738 A1   Oct. 24, 2019

(51) Int. Cl.
*G08G 1/01* (2006.01)
*G01C 21/30* (2006.01)
(Continued)

(52) U.S. Cl.
CPC ....... *G08G 1/0116* (2013.01); *G01C 21/3658* (2013.01); *G01S 19/51* (2013.01);
(Continued)

(58) Field of Classification Search
CPC ....... G05D 1/0212; G06F 16/29; G06F 17/15; G01S 19/51; G08G 1/0116; G08G 1/0141; G01C 21/3658
See application file for complete search history.

(56) References Cited

U.S. PATENT DOCUMENTS 7,650,227 B2 * 1/2010 Kirk .................. G01S 19/14
340/995.13
8,478,499 B2 * 7/2013 Rupp .................. G08G 1/0112
180/170

(Continued)

FOREIGN PATENT DOCUMENTS

CN   102708701 A   10/2012
CN   103413263 A   11/2013

OTHER PUBLICATIONS

Chen, Y. et al., *Probabilistic Modeling of Traffic Lanes From GPS Traces* (Research Paper), Proceedings of the 18th SIGSPATIAL International Conference on Advances in Geographic Information Systems (Nov. 2010) 8 pages.
(Continued)

*Primary Examiner* — Tyler J Lee
(74) *Attorney, Agent, or Firm* — Alston & Bird LLP

(57) ABSTRACT

Provided herein is a method for establishing lane-level data from probe data. Methods may include receiving probe data points associated with a plurality of vehicles; determining, for each of the probe data points, a location and road segment corresponding to the location; generating, from the probe data points associated with a first road segment, a probe density histogram for the first road segment, where the probe density histogram represents a volume of probe data points at each of a plurality of positions across a width of the first road segment; applying a deconvolution method to the probe density histogram to obtain a multi-modal histogram; determining, from the multi-modal histogram, a number of statistically significant peaks, where each statistically significant peak represents a lane of the first road segment; and computing, from the multi-modal histogram, lane-level properties of the probe data of the first road segment.

20 Claims, 12 Drawing Sheets

(51) Int. Cl.
  *G01S 19/51* (2010.01)
  *G06F 17/15* (2006.01)
  *G06F 16/29* (2019.01)
  *G01C 21/36* (2006.01)
  *G05D 1/02* (2006.01)

(52) U.S. Cl.
  CPC ........... *G05D 1/0212* (2013.01); *G06F 16/29* (2019.01); *G06F 17/15* (2013.01); *G08G 1/0141* (2013.01)

(56) References Cited

U.S. PATENT DOCUMENTS

| | | | |
|---|---|---|---|
| 8,639,654 B2* | 1/2014 | Vervaet | G01C 21/32 |
| | | | 707/602 |
| 8,949,021 B2* | 2/2015 | Witmer | G01C 21/32 |
| | | | 701/409 |
| 9,208,682 B2* | 12/2015 | Fowe | G01C 21/3492 |
| 9,240,123 B2* | 1/2016 | Stenneth | G08G 1/0125 |
| 9,341,488 B2* | 5/2016 | Mund | G01C 21/32 |
| 9,377,313 B2* | 6/2016 | Wilson | G01C 21/32 |
| 9,470,534 B2* | 10/2016 | Kesting | G01C 21/32 |
| 9,721,471 B2* | 8/2017 | Chen | G08G 1/167 |
| 9,847,024 B2* | 12/2017 | Witte | G08G 1/012 |
| 9,939,514 B2* | 4/2018 | Adachi | G01S 19/39 |
| 10,140,854 B2* | 11/2018 | Fowe | B60W 30/0953 |
| 10,140,856 B2* | 11/2018 | Bernhardt | G01C 21/3415 |
| 2010/0114484 A1* | 5/2010 | Kida | G06F 16/29 |
| | | | 701/532 |
| 2011/0243455 A1* | 10/2011 | Miyajima | G01C 21/3602 |
| | | | 382/201 |
| 2011/0243457 A1* | 10/2011 | Miyajima | G01C 21/3602 |
| | | | 382/209 |
| 2011/0276592 A1* | 11/2011 | Gautama | G01C 21/32 |
| | | | 707/769 |
| 2012/0197839 A1* | 8/2012 | Vervaet | G01C 21/32 |
| | | | 707/609 |
| 2012/0209518 A1* | 8/2012 | Nowak | G01C 15/002 |
| | | | 701/445 |
| 2012/0277985 A1* | 11/2012 | Witmer | G08G 1/09623 |
| | | | 701/119 |
| 2012/0277993 A1* | 11/2012 | Mund | G09B 29/106 |
| | | | 701/450 |
| 2013/0182957 A1* | 7/2013 | Wujcicki | G01C 21/32 |
| | | | 382/191 |
| 2014/0132608 A1* | 5/2014 | Mund | G01C 21/30 |
| | | | 345/440 |
| 2016/0171893 A1* | 6/2016 | Chen | G08G 1/167 |
| | | | 701/300 |
| 2017/0148311 A1* | 5/2017 | Kashiwakura | G08G 1/0112 |
| 2017/0263116 A1* | 9/2017 | Lorenz | G01C 21/3691 |
| 2018/0012082 A1 | 1/2018 | Satazoda et al. | |
| 2018/0329421 A1* | 11/2018 | Kindo | G05D 1/0223 |
| 2019/0113356 A1* | 4/2019 | Fowe | G01C 21/3492 |
| 2019/0130182 A1* | 5/2019 | Zang | G06K 9/00651 |

OTHER PUBLICATIONS

Wang, C. et al., *Intersection and Stop Bar Positon Extraction From Crowdsourced GPS Trajectories* (Research Paper), Transportation Research Board 96$^{th}$ Annual Meeting (2017) 18 pages.

Xie, C. et al., *A Maximum Entropy Method for Subnetwork Origin-Destination Trip Matrix Estimation* (Research Paper) (dated Jan. 2010) 25 pages.

Ziebart B. D. et al., *Maximum Entropy Inverse Reinforcement Learning* (Research Paper) (dated 2008), 6 pages.

Office Action for U.S. Appl. No. 15/956,339 dated Jun. 24, 2019.

\* cited by examiner

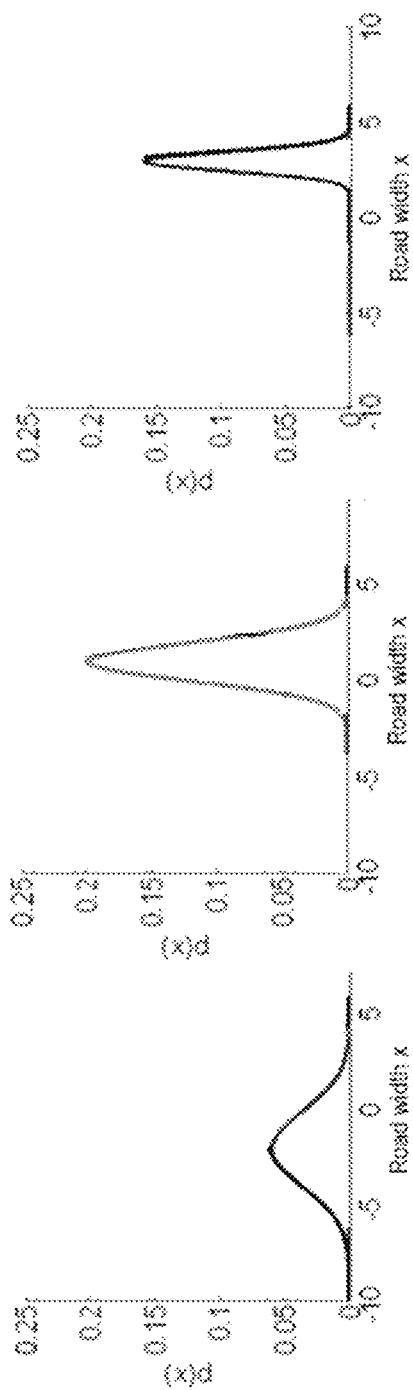
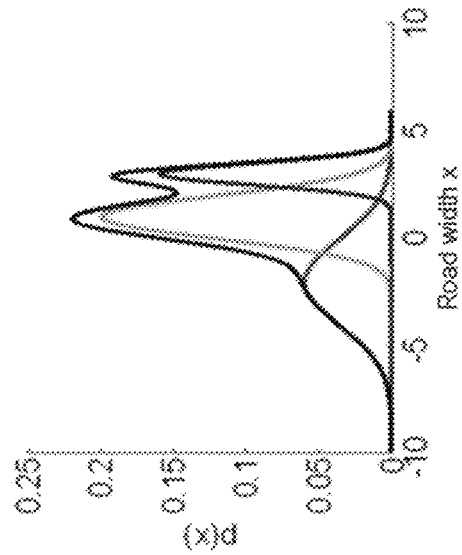
FIG. 4A
FIG. 4B
FIG. 4C
FIG. 4D

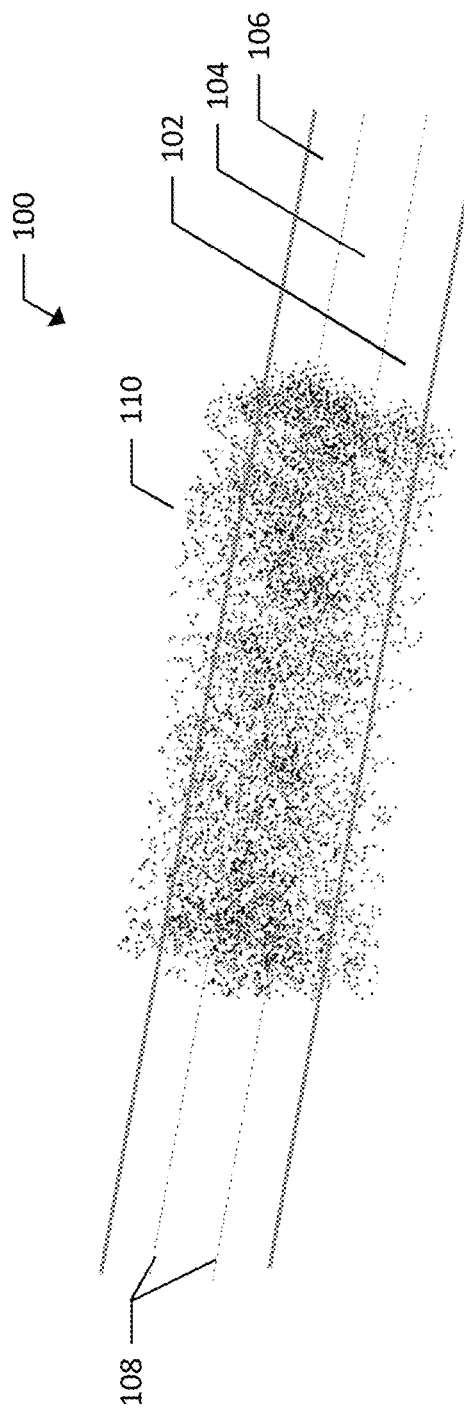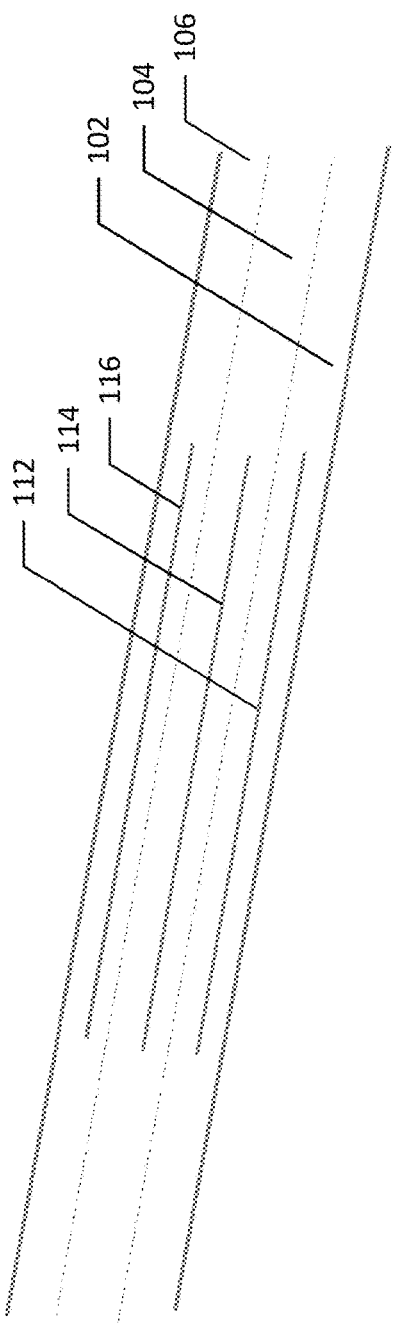
FIG. 6A
FIG. 6B

LANE-LEVEL GEOMETRY AND TRAFFIC INFORMATION

TECHNOLOGICAL FIELD

Example embodiments described herein relate generally to lane-level traffic information/data for multi-lane road segments, and more particularly, to gathering probe data to determine lane-level information/data in order to perform lane-level navigation and/or autonomous vehicle control along multi-lane road segments based on lane-level traffic information/data.

BACKGROUND

Generally, the location of a vehicle or probe may be determined using a global navigation satellite system (GNSS), an example of which is the United States' global positioning system (GPS). Other examples of GNSS systems are GLONASS (Russia), Galileo (European Union) and Beidou/Compass (China), all systems having varying degrees of accuracy. Under good conditions, GPS provides a real-time location of a probe vehicle with a 95% confidence interval of 7.8 meters, according to the US government. Given that the width of many lanes along a road segment is only 2.5 to 4 meters, this accuracy may not be sufficient to determine the particular lane of a road segment in which a probe vehicle is traveling. As a result, determining lane-level traffic information/data and/or performing lane-level navigation is difficult.

BRIEF SUMMARY OF EXAMPLE EMBODIMENTS

At least some example embodiments are directed to determining lane-level geometry and traffic information/data based on probe information/data. In an example embodiment, a mapping system may be provided including a memory having map data stored thereon and processing circuitry. The processing circuitry may be configured to receive probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus. For each of the probe data points, a location may be determined along with a road segment corresponding to the location. From the probe data points associated with a first road segment, a probe density histogram may be generated for the first road segment, where the probe density histogram represents a volume of probe data points at each of a plurality of positions across a width of the first road segment. A deconvolution method may be applied to the probe density histogram to obtain a multi-modal histogram. From the multi-modal histogram, a number of statistically significant peaks may be determined, where each statistically significant peak represents a lane of the first road segment. Lane-level properties of the probe data of the first road segment may be computed from the multi-modal histogram. Navigational assistance and/or at least semi-autonomous vehicle control may be provided based on the computed lane-level properties of the probe data of the first road segment.

According to some embodiments, the processing circuitry configured to compute, from the multi-modal histogram, lane-level properties of the probe data of the first road segment includes processing circuitry configured to determine, from the multi-modal histogram, a distance of each statistically significant peak from the first road segment centerline. The processing circuitry configured to compute, from the multi-modal histogram, lane-level properties of the probe data of the first road segment may include processing circuitry configured to: generate digital map data having a number of road segment lanes corresponding to the number of statistically significant peaks at positions corresponding to the distance of each statistically significant peak from the road segment centerline; and provide for at least semi-autonomous vehicle control or navigation assistance using the generated digital map data.

The processing circuitry configured to generate a probe density histogram for the first road segment representing a volume of probe data points at each of a plurality of positions across a width of the road segment may include processing circuitry configured to: sub-divide a width of the first road segment into a plurality of bins according to a chosen bin size; bin each probe data point to a respective one of the plurality of bins corresponding to a distance of the respective probe data point from a centerline of the road segment; and generate the probe density histogram based on a volume of probe data points in each bin across a width of the road segment. The deconvolution method used may include a Maximum Entropy Method. The processing circuitry configured to apply a deconvolution method to the probe density histogram to obtain a multi-modal histogram may include processing circuitry configured to: model location error of the probe data points associated with the first road segment using a point spread function; apply the deconvolution method to the probe density histogram using the point spread function; and generate the multi-modal histogram for the first road segment.

According to some embodiments, the processing circuitry configured to determine, from the multi-modal histogram, a number of statistically significant peaks, where each statistically significant peak represents a lane of the first road segment may include processing circuitry configured to identify a lane of the first road segment in response to a corresponding statistically significant peak being within typical minimum and maximum lane width range, such as a range of 2.5 meters to 3.6 meters of another statistically significant peak. The processing circuitry configured to, for each of the probe data points, determine a location and a road segment corresponding to the location may include processing circuitry configured to: map-match the probe data points to the first road segment; sub-divide the road segment into a plurality of sub-segments; and associate each of the probe data points map-matched to the first road segment to one of the plurality of sub-segments. The processing circuitry configured to generate, from the probe data points associated with a first road segment, a probe density histogram for the first road segment includes processing circuitry configured to generate, from probe data points associated with a first road segment, a probe density histogram for each of the sub-segments of the first road segment.

Embodiments described herein may provide an apparatus including at least one processor, at least one memory storing computer program code, with the at least one memory and the computer program code configured to, with the processor, cause the apparatus to at least receive probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus. For each of the probe data points, a location may be determined along with a road segment corresponding to the location. From the probe data points associated with the first road segment, a probe density histogram may be generated for the first road segment, where the probe density histogram represents a volume of probe data points at each of a plurality of positions across a width of the first road segment. A deconvolution method may be applied to the probe density histogram to obtain a multi-modal histogram from which a number of statistically significant peaks may be determined, each statistically significant peak representing a lane of the first road segment. From the multi-modal histogram, lane-level properties of the probe data of the first road segment may be computed. Navigational assistance and/or at least semi-autonomous vehicle control may be provided based on the computed lane-level properties of the probe data of the first road segment.

According to some embodiments, causing the apparatus to compute, from the multi-modal histogram, lane-level properties of the probe data of the first road segment may include causing the apparatus to determine, from the multi-modal histogram, a distance of each statistically significant peak from the first road segment centerline. Causing the apparatus to compute, from the multi-modal histogram, lane-level properties of the probe data of the first road segment may include causing the apparatus to: generate digital map data having a number of road segment lanes corresponding to the number of statistically significant peaks at positions corresponding to the distance of each statistically significant peak from the road segment centerline; and provide for at least semi-autonomous vehicle control or navigation assistance using the generated digital map data.

Causing the apparatus to generate a probe density histogram for the first road segment representing a volume of probe data points at each of a plurality of positions across a width of the road segment may include causing the apparatus to: sub-divide a width of the first road segment into a plurality of bins according to a chosen bin size; bin each probe data point to a respective one of the plurality of bins corresponding to a distance of the respective probe data point from a centerline of the road segment; and generate the probe density histogram based on a volume of probe data points in each bin across a width of the road segment. The deconvolution method used may include a Maximum Entropy Method.

According to some embodiments, causing the apparatus apply a deconvolution method to the probe density histogram to obtain a multi-modal histogram may include causing the apparatus to: model location error of the probe data points associated with the first road segment using a point spread function; apply the deconvolution method to the probe density histogram using the point spread function; and generate the multi-modal histogram for the first road segment. Causing the apparatus to determine, from the multi-modal histogram, a number of statistically significant peaks, where each statistically significant peak represents a lane of the first road segment may include causing the apparatus to identify a lane of the first road segment in response to a corresponding statistically significant peak being within a range of 2.5 meters to 3.6 meters of another statistically significant peak.

The apparatus of some embodiments, caused to determine a location and a road segment corresponding to the location of the probe data points may include being caused to: map-match the probe data points to the first road segment; sub-divide the road segment into a plurality of sub-segments; and associate each of the probe data points map-matched to the first road segment to one of the plurality of sub-segments. Causing the apparatus to generate, from the probe data points associated with a first road segment, a probe density histogram for the first road segment may include causing the apparatus to generate, from the probe data points associated with a first road segment, a probe density histogram for each of the sub-segments of the first road segment.

Embodiments described herein may provide a method for establishing lane-level data from probe data. Methods may include receiving probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus. Methods may include: determining, for each of the probe data points, a location and road segment corresponding to the location; generating, from the probe data points associated with a first road segment, a probe density histogram for the first road segment, where the probe density histogram represents a volume of probe data points at each of a plurality of positions across a width of the first road segment; applying a deconvolution method to the probe density histogram to obtain a multi-modal histogram; determining, from the multi-modal histogram, a number of statistically significant peaks, where each statistically significant peak represents a lane of the first road segment; computing, from the multi-modal histogram, lane-level properties of the probe data of the first road segment; and providing for at least one of navigational assistance or at least semi-autonomous vehicle control based on the computed lane-level properties of the probe data of the first road segment.

According to some embodiments, computing, from the multi-modal histogram, lane-level properties of the probe data of the first road segment may include: determining, from the multi-modal histogram, a distance of each statistically significant peak from the first road segment centerline. Computing, from the multi-modal histogram, lane-level properties of the probe data of the first road segment may include: generating digital map data having a number of road segment lanes corresponding to the number of statistically significant peaks at positions corresponding to the distance of each statistically significant peak from the road segment centerline; and providing for at least semi-autonomous vehicle control or navigation assistance using the generated digital map data. Generating a probe density histogram for the first road segment representing a volume of probe data points at each of a plurality of positions across a width of the road segment may include: sub-dividing a width of the first road segment into a plurality of bins according to a chosen bin size; binning each probe data point to a respective one of the plurality of bins corresponding to a distance of the respective probe data point from a centerline of the road segment; and generating the probe density histogram based on a volume of probe data points in each bin across a width of the road segment.

Embodiments described herein may provide an apparatus for establishing lane-level data from probe data. An example apparatus may include means for receiving probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus. The apparatus may include: means for determining, for each of the probe data points, a location and road segment corresponding to the location; means for generating, from the probe data points associated with a first road segment, a probe density histogram for the first road segment, where the probe density histogram represents a volume of probe data points at each of a plurality of positions across a width of the first road segment; means for applying a deconvolution method to the probe density histogram to obtain a multi-modal histogram; means for determining, from the multi-modal histogram, a number of statistically significant peaks, where each statistically significant peak represents a lane of the first road segment; means for computing, from the multi-modal histogram, lane-level properties of the probe data of the first road segment; and means for providing for at least one of navigational assistance or at least semi-autonomous vehicle control based on the computed lane-level properties of the probe data of the first road segment.

According to some embodiments, the means for computing, from the multi-modal histogram, lane-level properties of the probe data of the first road segment may include: means for determining, from the multi-modal histogram, a distance of each statistically significant peak from the first road segment centerline. The means for computing, from the multi-modal histogram, lane-level properties of the probe data of the first road segment may include: means for generating digital map data having a number of road segment lanes corresponding to the number of statistically significant peaks at positions corresponding to the distance of each statistically significant peak from the road segment centerline; and means for providing for at least semi-autonomous vehicle control or navigation assistance using the generated digital map data. The means for generating a probe density histogram for the first road segment representing a volume of probe data points at each of a plurality of positions across a width of the road segment may include: means for sub-dividing a width of the first road segment into a plurality of bins according to a chosen bin size; binning each probe data point to a respective one of the plurality of bins corresponding to a distance of the respective probe data point from a centerline of the road segment; and means for generating the probe density histogram based on a volume of probe data points in each bin across a width of the road segment.

Embodiments described herein may provide a computer program product having at least one non-transitory computer-readable storage medium having the computer-executable program code instructions stored there. The computer-executable program code instructions including program code instructions to: receive probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus; for each of the probe data points, determine a location and a road segment corresponding to the location; generate, from the probe data points associated with a first roads segment, a probe density histogram for the first road segment where the probe density histogram represents a volume of probe data points at each of a plurality of positions across a width of the first road segment; apply a deconvolution method to the probe density histogram to obtain a multi-modal histogram; determine from the multi-modal histogram, a number of statistically significant peaks where each statistically significant peak represents a lane of the first road segment; compute, from the multi-modal histogram, lane-level properties of the probe data of the first road segment; and store the computed lane-level properties of the probe data of the first road segment to a geographic database.

According to some embodiments, the program code instructions to compute, from the multi-modal histogram, lane-level properties of the probe data of the first road segment may include program code instructions to: determine, from the multi-modal histogram, a distance of each statistically significant peak from the first road segment centerline. The program code instructions to compute, from the multi-modal histogram, lane-level properties of the probe data of the first road segments may include program instructions to: generate digital map data having a number of road segment lanes corresponding to the number of statistically significant peaks at positions corresponding to the distance of each statistically significant peak from the road segment centerline; and provide for at least semi-autonomous vehicle control or navigation assistance using the generated digital map data.

The program code instructions to generate a probe density histogram for the first road segment representing a volume of probe data points at each of a plurality of positions across a width of the road segment may include program code instructions to: sub-divide a width of the first road segment into a plurality of bins according to a chosen bin size; bin each probe data point to a respective one of the plurality of bins corresponding to a distance of the respective probe data point from a centerline of the road segment; and generate the probe density histogram based on a volume of probe data points in each bin across a width of the road segment. The deconvolution method may include a Maximum Entropy Method. The program code instructions to apply a deconvolution method to the probe density histogram to obtain a multi-modal histogram may include program code instructions to: model location error of the probe data points associated with the first road segment using a point spread function; apply the deconvolution method to the probe density histogram using the point spread function; and generate the multi-modal histogram for the first road segment.

According to some embodiments, the program code instructions to determine, from the multi-modal histogram, a number of statistically significant peaks, where each statistically significant peak represents a lane of the first road segment may include program code instructions to: identify a lane of the first road segment in response to a corresponding statistically significant peak being within a range of 2.5 meters to 3.6 meters of another statistically significant peak. The program code instructions to, for each of the probe data points, determine a location and a road segment corresponding to the location may include program code instructions to: map-match the probe data points to the first road segment; sub-divide the road segment into a plurality of sub-segments; and associate each of the probe data points map-matched to the first road segment to one of the plurality of sub-segments, where the program code instructions to generate, from the probe data points associated with a first road segment, a probe density histogram for the first road segment may include causing the apparatus to generate, from the probe data points associated with a first road segment, a probe density histogram for each of the sub-segments of the first road segment.

Embodiments described herein may provide a mapping system including: a memory including map data and processing circuitry. The processing circuitry may be configured to: receive probe data points associated with a plurality of vehicles, each probe data point received from a probe apparatus of a plurality of probe apparatuses, each probe apparatus including one or more sensors and being onboard a respective vehicle, each probe data point including location information associated with the respective probe apparatus; determine a location and road segment corresponding to the location for each of the probe data points; generate, from the probe data points associated with a first road segment, a cell-density image of the first road segment, where the pixel-density image represents a volume of probe data points at each of a plurality of cells of a grid overlaid in the first road segment; apply a deconvolution method to the cell-density image to obtain a refined cell-density image having a lower degree of data point spread relative to the cell density-image; determine, from the refined cell-density image, a number of paths along the first road segment, where each path represents a lane of the first road segment; compute, from the refined cell-density image, lane-level properties of the probe data of the first road segment; and provide data for at least one of navigational assistance or at least semi-autonomous vehicle control based on the computed lane-level properties of the probe data of the first road segment.

According to some embodiments, the processing circuitry configured to determine, from the refined cell-density image, a number of paths along the road segment may include processing circuitry configured to establish at least one trajectory within the refined cell-density image, where the at least one trajectory includes a sequence of cells having a relatively high volume of probe data at each of the sequence of cells relative to cells proximate the sequence of cells. The processing circuitry configured to compute, from the refined cell-density image, lane-level properties of the probe data of the first road segment may include processing circuitry configured to: generate digital map data having a number of road segment lanes corresponding to the number of trajectories at positions corresponding to the trajectories on the first road segment; and provide for at least semi-autonomous vehicle control or navigation assistance using the generated digital map data. The cell-density image may include a three-dimensional cell grid, the three dimensions representing latitude, longitude, and altitude. The processing circuitry configured to determine, from the refined cell-density image, a number of paths along the road segment may include processing circuitry configured to identify, from the refined cell-density image, at least one path that is on a different altitude plane than at least one path along the first road segment, and associate the at least one path that is on a different altitude plane with a second road segment, different from the first road segment.

The probe data points may each include a timestamp, where the processing circuitry configured to generate, from the probe data points associated with a first road segment, a cell-density image of the first road segment may include processing circuitry configured to: separate the probe data points into at least two different periods of time based on the respective timestamps; and generate, from the probe data points associated with the first road segment and associated with each period of time, a spatiotemporal cell-density image dimension of the first road segment for each period of time. The processing circuitry of some embodiments may be configured to: apply a deconvolution method to the spatiotemporal cell-density image; and determine, from the refined spatiotemporal cell-density image, a number of paths along the first road segment for at least two different time ranges. The deconvolution method of some embodiments may include a Maximum Entropy Method.

Embodiments provided herein may include a computer program product including at least one non-transitory computer-readable storage medium having computer-executable program code instructions stored therein. The computer-executable program code instructions may include program code instructions to: receive probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus; for each probe data point, determine a location and a road segment corresponding to the location; generate, from the probe data points associated with the first road segment, a cell-density image of the first road segment, where the cell-density image represents a volume of probe data points at each of a plurality of cells of a grid overlaid on the first road segment; apply a deconvolution method to the cell-density image to obtain a refined cell-density image having a lower degree of data point spread relative to the cell-density image; determine, from the refined cell-density image, a number of paths along the first road segment, where each path represents a lane of the first road segment; compute, from the refined cell-density image, lane-level properties of the probe data of the first road segment; and store the computed lane-level properties of the probe data of the first road segment to augment a geographic database.

The program code instructions to determine from the refined cell-density image, a number of paths along the road segment may include program code instructions to: establish at least one trajectory within the refined cell-density image, where the at least one trajectory includes a sequence of cells having a relatively high volume of probe data at each of the sequence of cells relative to cells proximate the sequence of cells. The program code instructions to compute, from the refined cell-density image, lane-level properties of the probe data of the first road segment may include program code instructions to: generate digital map data having a number of road segment lanes corresponding to the number of trajectories at positions corresponding to the trajectories on the first road segment; and provide for at least semi-autonomous vehicle control or navigation assistance using the generated digital map data.

The cell-density image of some embodiments may include a three-dimensional cell grid, the three dimensions representing latitude, longitude, and altitude. The program code instructions to determine, from the refined cell-density image, a number of paths along the road segment may further include program code instructions to identify, from the refined cell-density image, at least one path that is on different altitude plane than the at least one path along the first road segment, and associate the at least one path that is on a different altitude plane with a second road segment, different from the first road segment. The probe data points may each include a timestamp, where the program code instructions to generate, from the probe data points associated with the first road segment, a cell-density image of the first road segment may include program code instructions to: separate the probe data points into at least two different periods of time based on the respective timestamps; and generate, from the probe data points associated with the first road segment and associated with each period of time, a spatiotemporal cell-density image dimension of the first road segment for each period of time. The computer program product of some embodiments may include program code instructions to: apply a deconvolution method to the spatiotemporal cell-density image; and determine from the refined spatiotemporal cell-density image, a number of paths along the first road segment for at least two different time ranges. The deconvolution method may include a Maximum Entropy Method.

Embodiments provided herein include a method for establishing lane-level data from probe data. Methods may include: receiving probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus; determining, for each of the probe data points, a location and a road segment corresponding to the location; generating, from the probe data points associated with a first road segment, a cell-density image of the first road segment, where the cell-density image represents a volume of probe data points at each of a plurality of cells of a grid overlaid on the first road segment; applying a deconvolution method to the cell-density image to obtain a refined cell-density image having a lower degree of data point spread relative to the cell-density image; determining, from the refined cell-density image, a number of paths along the first road segment, where each path represents a lane of the first road segment; computing, from the refined cell-density image, lane-level properties of the probe data of the first road segment; and providing data for at least one of navigational assistance or at least semi-autonomous vehicle control based on the computed lane-level properties of the first road segment.

According to some embodiments, determining, from the refined cell-density image, a number of paths along the road segment, may include: establishing at least one trajectory within the refined cell-density image, where the at least one trajectory includes a sequence of cells having a relatively high volume of probe data at each of the sequence of cells relative to cells proximate the sequence of cells. Computing, from the refined cell-density image, lane-level properties of the probe data of the first road segment may include: generating digital map data having a number of road segment lanes corresponding to the number of trajectories at positions corresponding to the trajectories on the first road segment; and providing for at least semi-autonomous vehicle control or navigation assistance using the generated digital map.

The cell-density image of some embodiments may include a three-dimensional cell grid, the three dimensions representing latitude, longitude, and altitude. Determining, from the refined cell density image, a number of paths along the road segment may include identifying, from the refined cell-density image, at least one path that is on a different altitude plane than at least one path along the first road segment, and associating the at least one path that is on a different altitude plane with a second road segment, different from the first road segment. The probe data points may each include a timestamp, where generating, from the probe data points associated with a first road segment, a cell-density image of the first road segment may include: separating the probe data points into at least two different periods of time based on the respective timestamps; and generating, from the probe data points associated with the first road segment and associated with each period of time, a spatiotemporal cell-density image dimension of the first road segment for each period of time. Methods may include applying a deconvolution method to the spatiotemporal cell-density image, and determining, from the refined spatiotemporal cell-density image, a number of paths along the first road segment for at least two different time ranges.

Embodiments provided herein include an apparatus for establishing lane-level data from probe data. An example apparatus may include: means for receiving probe data points associated with a plurality of vehicles, each probe data point received from a probe apparatus of a plurality of probe apparatuses, each probe apparatus including one or more sensors and being onboard a respective vehicle, where each probe data point includes location information associated with the respective probe apparatus; means for determining, for each of the probe data points, a location and a road segment corresponding to the location; means for generating, from the probe data points associated with a first road segment, a cell-density image of the first road segment, where the cell-density image represents a volume of probe data points at each of a plurality of cells of a grid overlaid on the first road segment; means for applying a deconvolution method to the cell-density image to obtain a refined cell-density image having a lower degree of data point spread relative to the cell-density image; means for determining, from the refined cell-density image, a number of paths along the first road segment, where each path represents a lane of the first road segment; means for computing, from the refined cell-density image, lane-level properties of the probe data of the first road segment; and providing data for at least one of navigational assistance or at least semi-autonomous vehicle control based on the computed lane-level properties of the first road segment.

According to some embodiments, the means for determining, from the refined cell-density image, a number of paths along the road segment, may include: means for establishing at least one trajectory within the refined cell-density image, where the at least one trajectory includes a sequence of cells having a relatively high volume of probe data at each of the sequence of cells relative to cells proximate the sequence of cells. The means for computing, from the refined cell-density image, lane-level properties of the probe data of the first road segment may include: means for generating digital map data having a number of road segment lanes corresponding to the number of trajectories at positions corresponding to the trajectories on the first road segment; and means for providing for at least semi-autonomous vehicle control or navigation assistance using the generated digital map.

The cell-density image of some embodiments may include a three-dimensional cell grid, the three dimensions representing latitude, longitude, and altitude. The means for determining, from the refined cell density image, a number of paths along the road segment may include means for identifying, from the refined cell-density image, at least one path that is on a different altitude plane than at least one path along the first road segment, and means for associating the at least one path that is on a different altitude plane with a second road segment, different from the first road segment. The probe data points may each include a timestamp, where the means for generating, from the probe data points associated with a first road segment, a cell-density image of the first road segment may include: means for separating the probe data points into at least two different periods of time based on the respective timestamps; and means for generating, from the probe data points associated with the first road segment and associated with each period of time, a spatiotemporal cell-density image dimension of the first road segment for each period of time. The apparatus of example embodiments may include means for applying a deconvolution method to the spatiotemporal cell-density image, and means for determining, from the refined spatiotemporal cell-density image, a number of paths along the first road segment for at least two different time ranges.

BRIEF DESCRIPTION OF THE DRAWINGS

Figure 1:
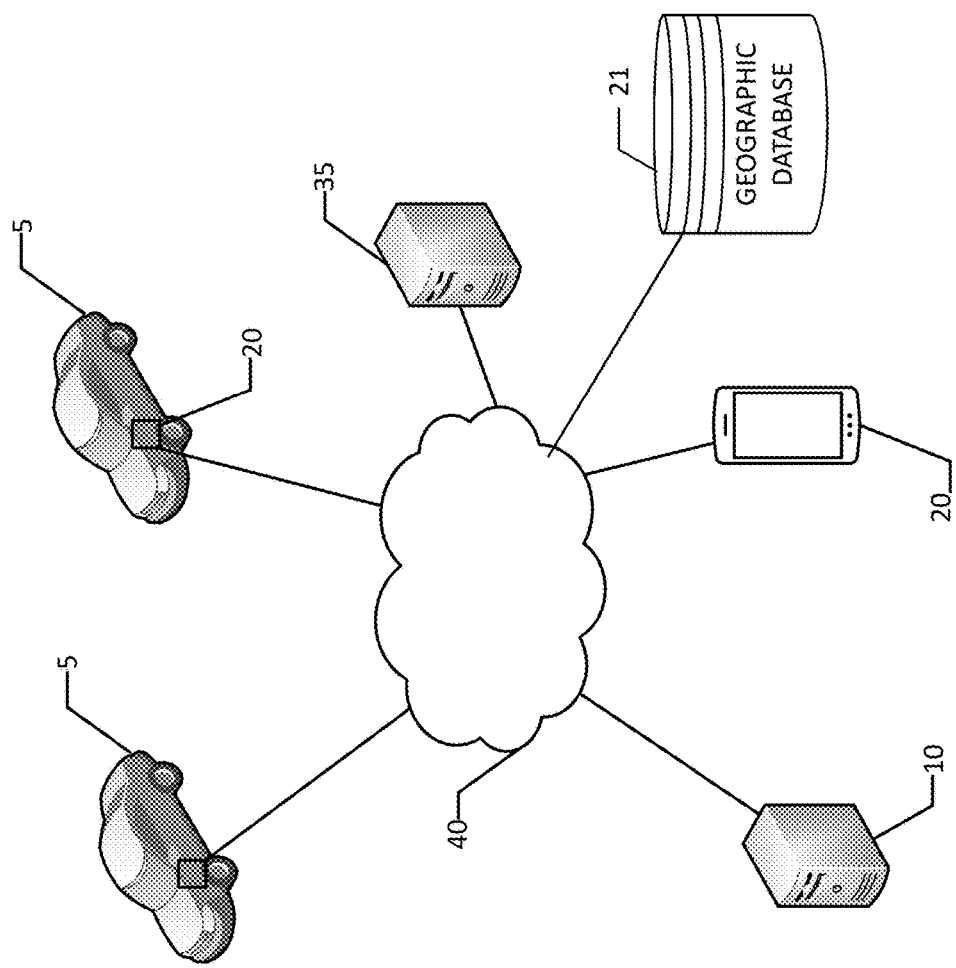
Figure 2:
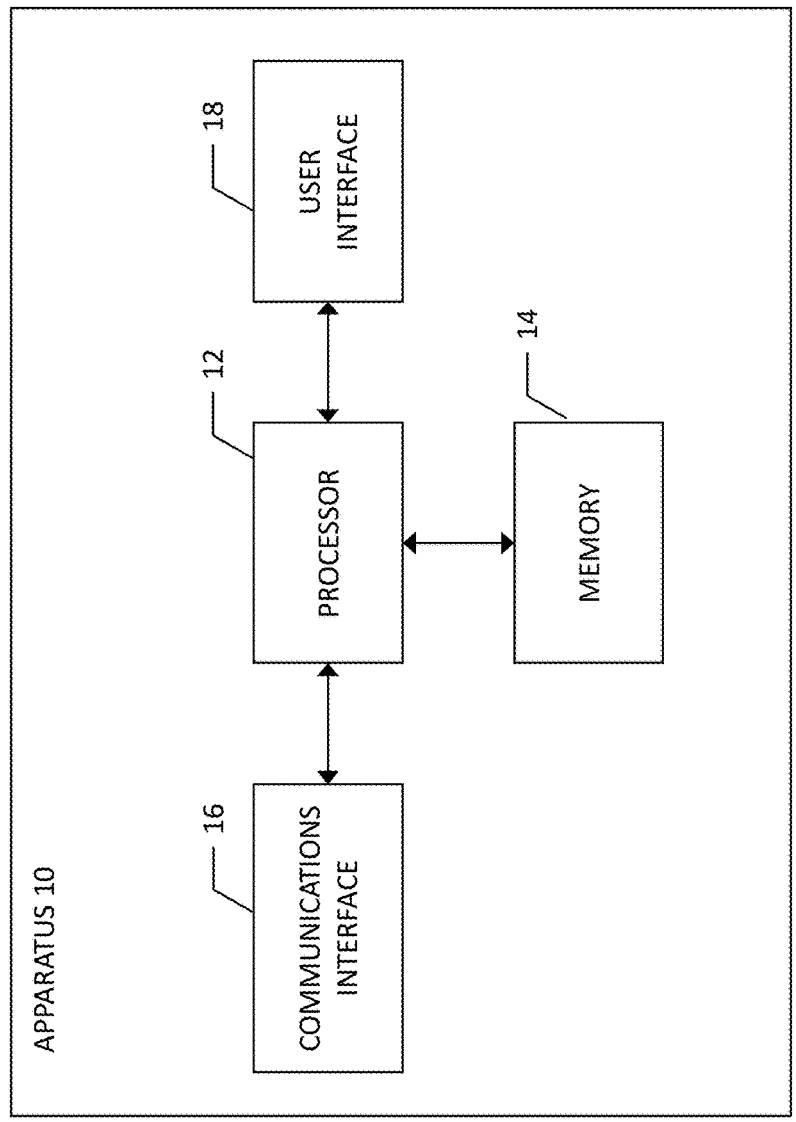
Figure 3:
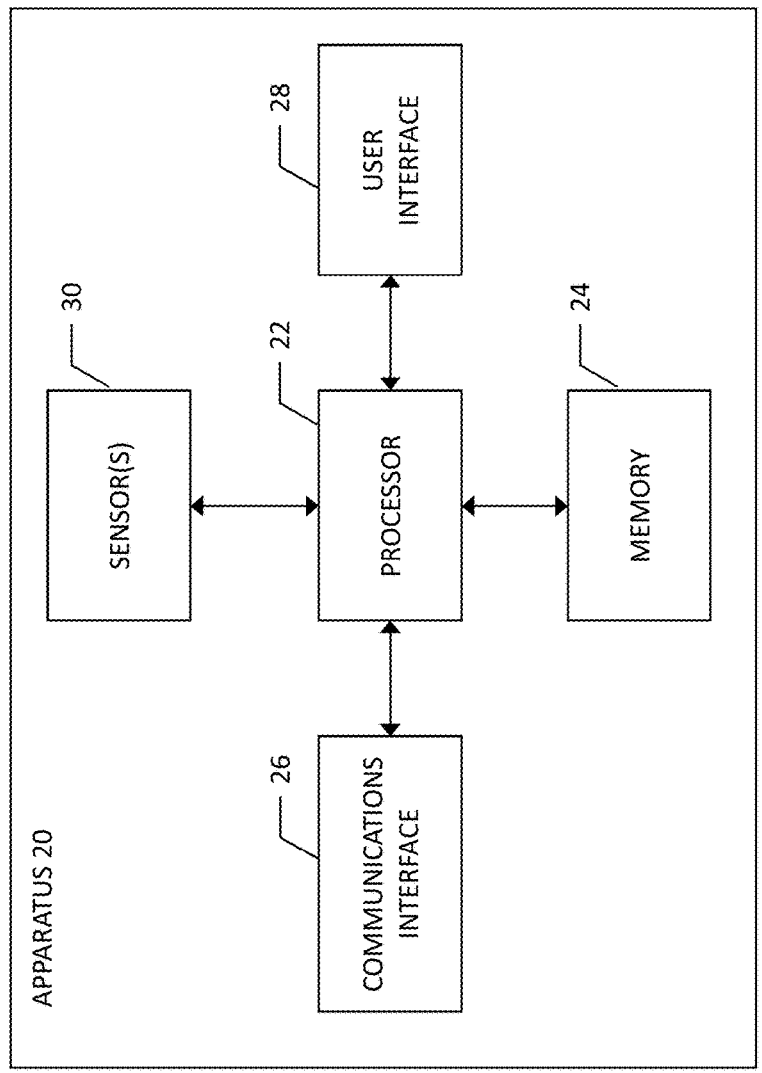
Figure 5:
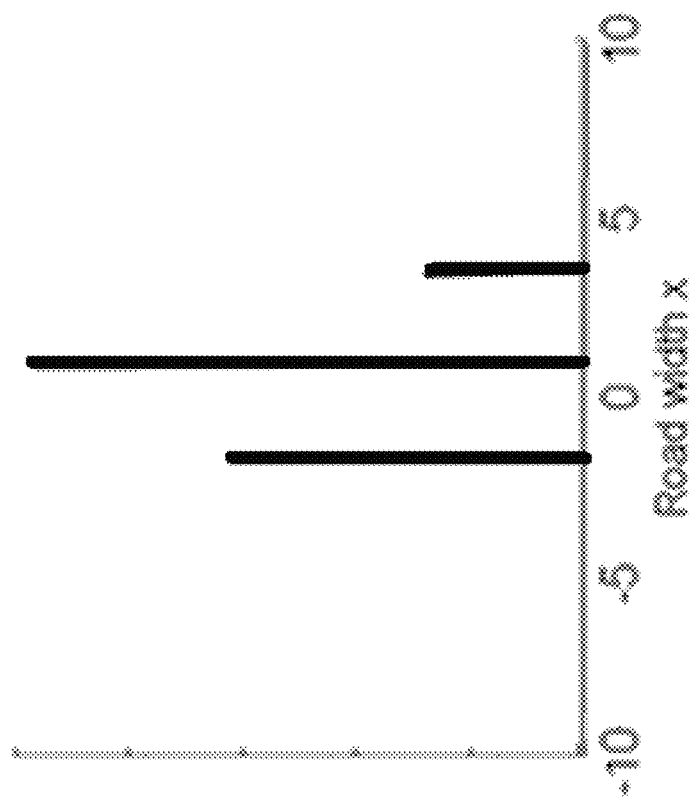
Figure 7:
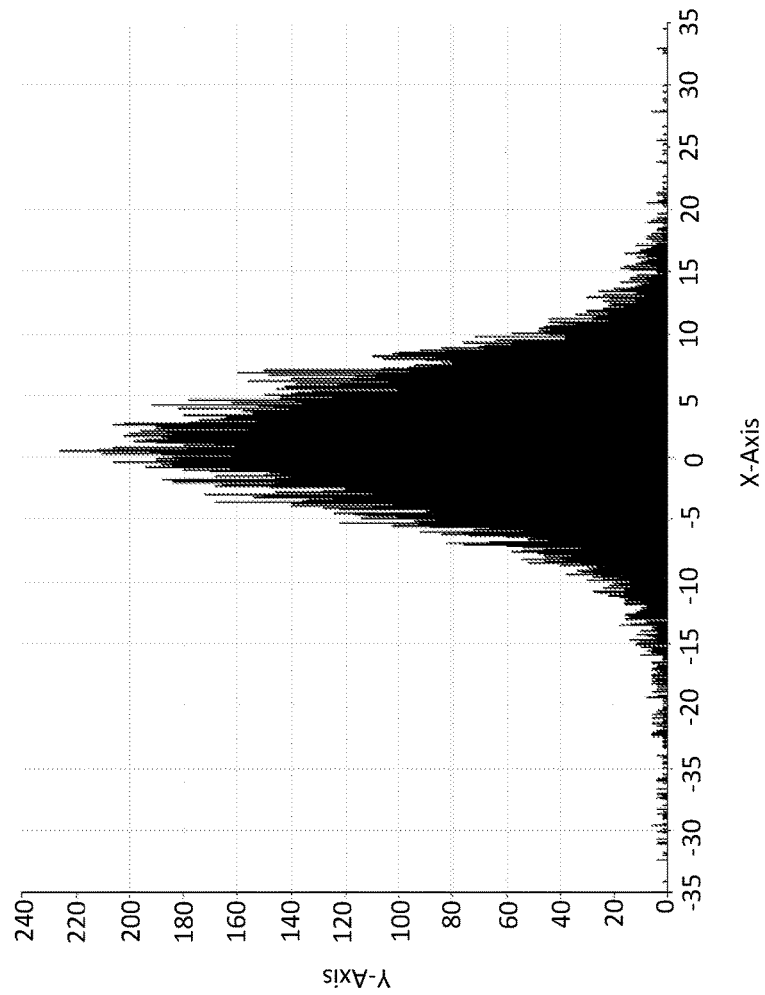
Figure 8:
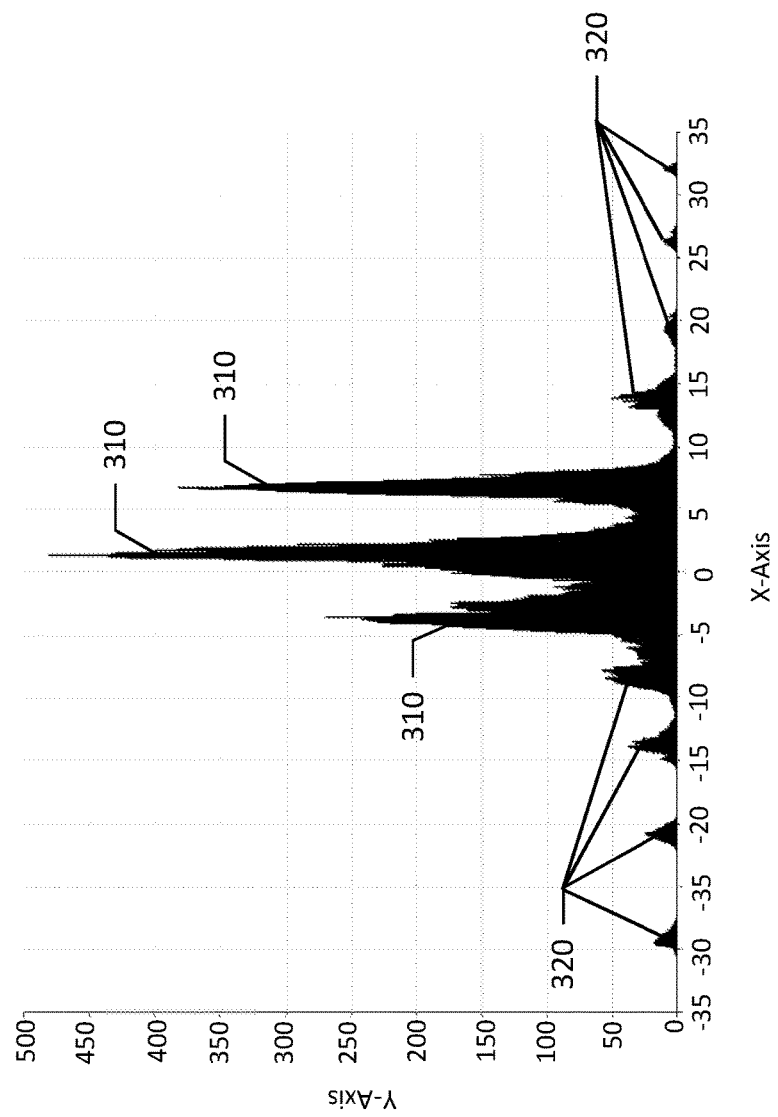
Figure 9C:
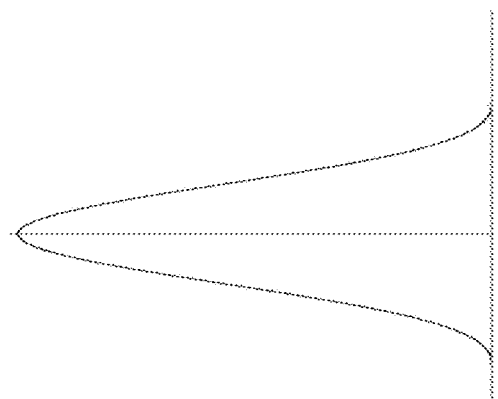
Figure 9B:
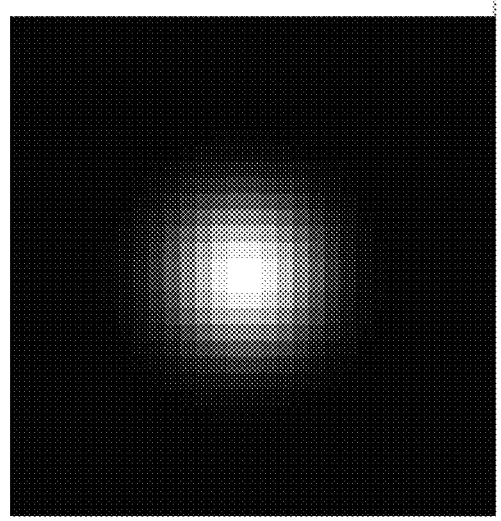
Figure 9A:
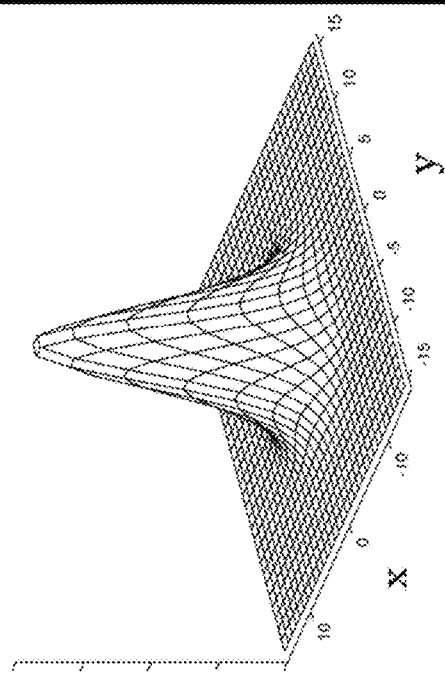
Figure 10:
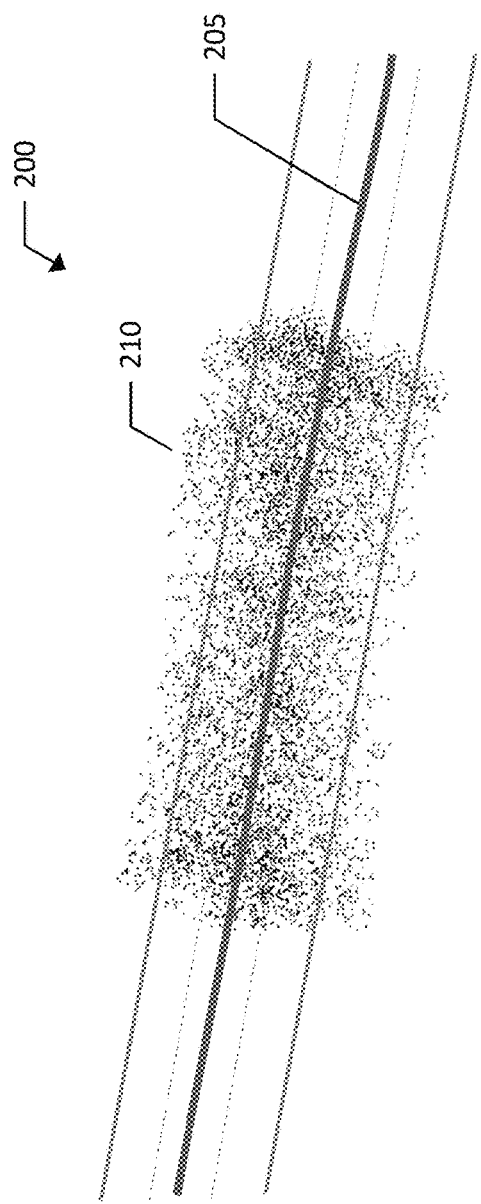
Figure 11:
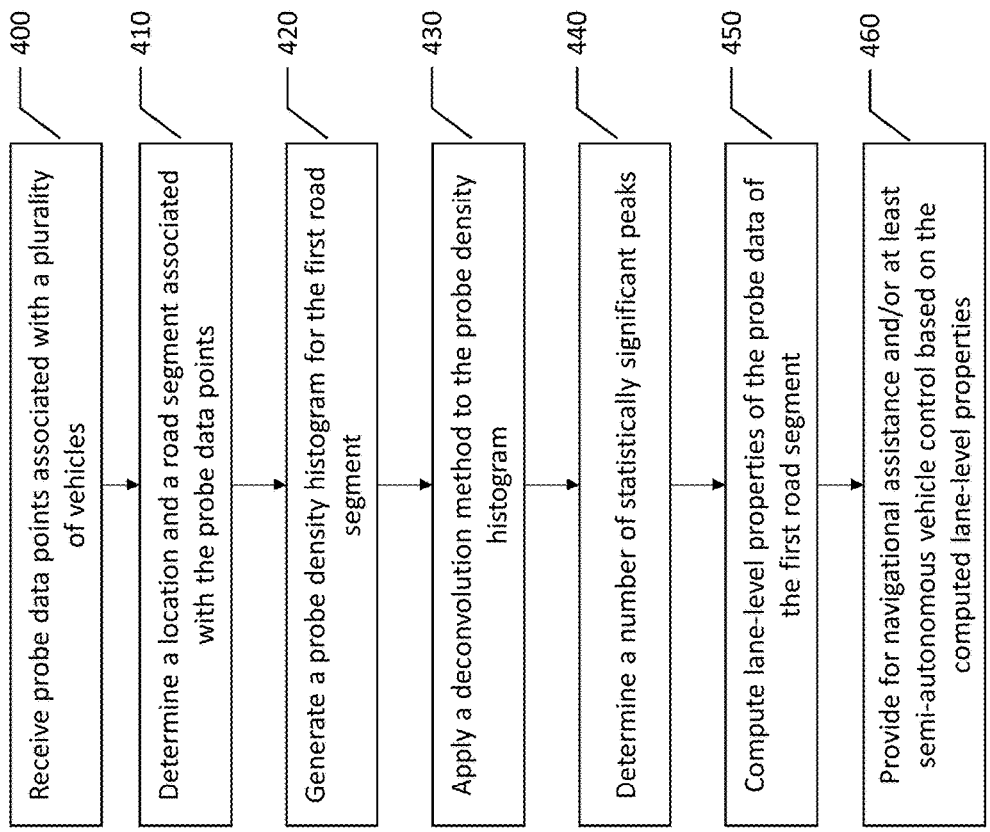
Figure 12:
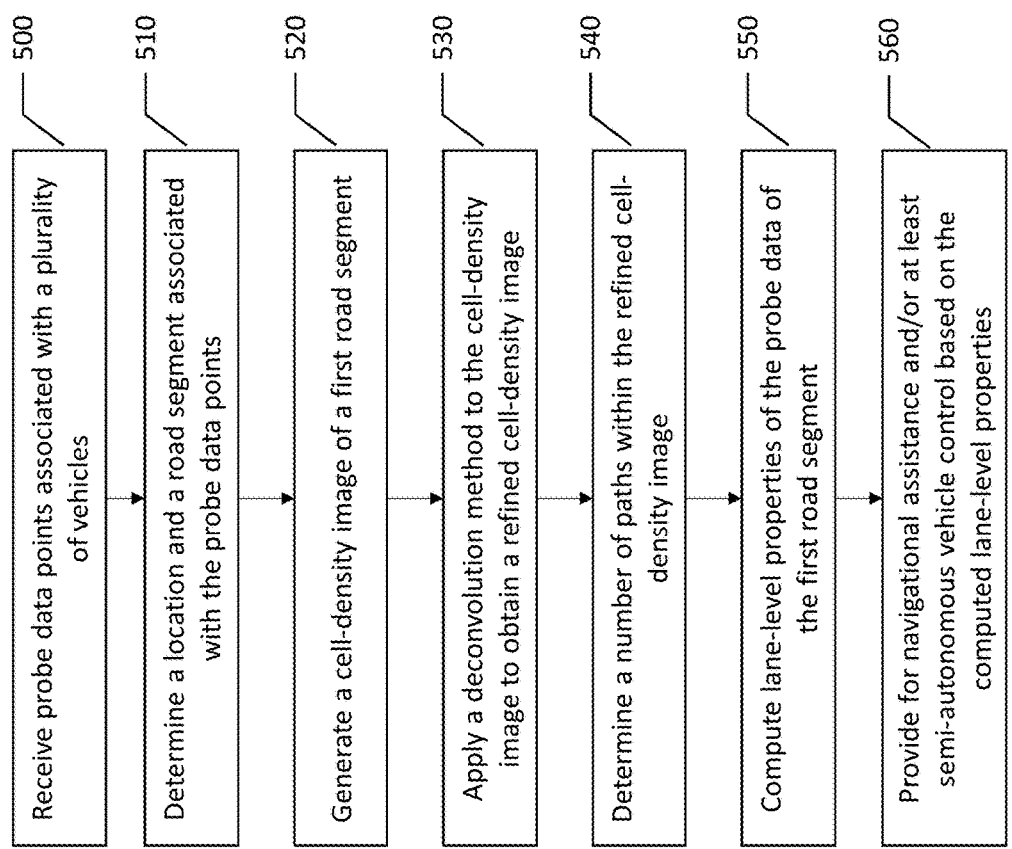

Having thus described certain example embodiments in general terms, reference will hereinafter be made to the accompanying drawings, which are not necessarily drawn to scale, and wherein:

FIG. 1 is a block diagram showing an example architecture of an example embodiment described herein;

FIG. 2 is a block diagram of an apparatus that may be specifically configured in accordance with an example embodiment;

FIG. 3 is a block diagram of a probe apparatus that may be specifically configured in accordance with an example embodiment;

FIGS. 4A-4D are plots depicting probe data gathered from a three lane road segment in accordance with an example embodiment;

FIG. 5 illustrates a plot of probe data gathered from a three lane road segment after deconvolution according to an example embodiment described herein;

FIG. 6A illustrates probe data gathered along a road segment according to an example embodiment;

FIG. 6B illustrates the resultant lane-level road model from the probe data of FIG. 6A after deconvolution of the probe data of FIG. 6A;

FIG. 7 illustrates a histogram of probe data points gathered along a road segment;

FIG. 8 illustrates a histogram of probe data points gathered along a road segment after deconvolution according to an example embodiment described herein;

FIGS. 9A-9C illustrate different representations of point spread functions according to an example embodiment;

FIG. 10 illustrates probe data points associated with a road segment and a road segment centerline of the road segment according to an example embodiment;

FIG. 11 is a flowchart of a method for establishing lane-level data from probe data points according to an example embodiment described herein; and FIG. 12 is a flowchart of another method for establishing lane-level data from probe data points according to an example embodiment described herein.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Methods, apparatus and computer program products are provided in accordance with an example embodiment in order to discern lane-level geometry and traffic information/data from raw probe data. In some example embodiments, the lane-level geometry traffic information/data may be used to perform lane-level navigation, route planning, autonomous or semi-autonomous vehicle control, and/or the like. For example, a plurality of instances of probe information/data may be received from probe apparatuses traveling along a road segment onboard vehicles. An instance of probe information/data may comprise, among other information, location information/data, heading information/data, etc. For example, the probe information/data may comprise a geophysical location (e.g., latitude and longitude) indicating the location of the probe apparatus at the time that the probe information/data is generated and/or provided (e.g., transmitted). The probe information/data may optionally include a heading or direction of travel. In an example embodiment, an instance of probe information/data may comprise a probe identifier identifying the probe apparatus that generated and/or provided the probe information/data, a timestamp corresponding to when the probe information/data was generated, and/or the like. Based on the probe identifier and the timestamp a sequence of instances of probe information/data may be identified. For example, the instances of probe information of data corresponding to a sequence of instances of probe information/data may each comprise the same probe identifier. In an example embodiment, the instances of probe information/data in a sequence of instances of probe information/data are ordered based on the timestamps associated therewith.

As noted above, lane-level geometry and traffic information may be used of facilitate navigation, autonomous vehicle control, or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying lane-level geometry and traffic information for a road segment that a vehicle may traverse may provide information useful to navigation and autonomous or semi-autonomous vehicle control by establishing the number of lanes available, the traffic mixture or density in each of the lanes, or other information regarding the road segments that may be traversed by the vehicle.

FIG. 1 provides an illustration of an example system that can be used in conjunction with various embodiments of the present invention. As shown in FIG. 1, the system may include a plurality of probe apparatuses 20, one or more apparatuses 10, one or more other computing entities 35, one or more networks 40, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like. In example embodiments, a probe apparatus 20 is onboard a dedicated probe vehicle. In some embodiments, a probe apparatus 20 may be onboard a personal vehicle, commercial vehicle, public transportation vehicle, and/or other vehicle. In an example embodiment, a probe apparatus 20 is any apparatus that provides (e.g., transmits) probe information/data to the apparatus 10.

In an example embodiment, an apparatus 10 may comprise components similar to those shown in the example apparatus 10 diagrammed in FIG. 2. In an example embodiment, the apparatus 10 is configured to provide map updates, traffic information/data, and/or the like to the probe apparatus 20 and/or computing entity 35. In an example embodiment, a probe apparatus 20 may comprise components similar to those shown in the example probe apparatus 20 diagrammed in FIG. 3. In various embodiments, the apparatus 10 may be located remotely from the probe apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a probe apparatus 20 may be in communication with an apparatus 10 via the network 40. For example, the probe apparatus 20 may communicate with the apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the apparatus 10, traffic information/data (embedded in a map tile of a digital map or separate therefrom), and/or provide probe information/data to the apparatus 10.

In an example embodiment, as shown in FIG. 3, the probe apparatus 20 may comprise a processor 22, memory 24, a communications interface 26, a user interface 28, one or more sensors 30 (e.g., a location sensor such as a GPS sensor or GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; and/or other sensors that enable the probe apparatus 20 to determine one or more features of the corresponding vehicle's 5 surroundings), and/or other components configured to perform various operations, procedures, functions or the like described herein. In at least some example embodiments, the memory 24 is non-transitory.

Similarly, as shown in FIG. 2, the apparatus 10 may comprise a processor 12, memory 14, a user interface 18, a communications interface 16, and/or other components configured to perform various operations, procedures, functions or the like described herein. In at least some example embodiments, the memory 14 is non-transitory. The computing entity 35 may comprise similar elements to the apparatus 10 and/or the probe apparatus 20. For example, the computing entity 35 may comprise a processor, memory, a user interface, a communications interface, and/or the like. In example embodiments, the computing entity 35 may comprise one or more sensors similar to sensor(s) 30. Certain example embodiments of the probe apparatus 20 and the apparatus 10 are described in more detail below with respect to FIGS. 2 and 3.

In at least some example embodiments, probe information/data may be analyzed to determine lane-level geometry and traffic information/data. In an example embodiment, the lane-level geometry and traffic information/data may be used to perform various lane-level navigation determinations, calculations, computations, and/or the like.

For example, a vehicle lane pattern and relevant traffic data may be established for a road segment and/or a link of a digital map corresponding to the road segment. In example embodiments, a vehicle lane pattern may comprise information regarding the number of lanes along the road segment, a lane identifier for each lane of the road segment, lane center geometry, mixture weight that expresses the relative traffic volume in each lane, paint stripe geometry, and lane count change locations where lanes are added or begin to end/taper.

Establishing lane-level data for a road segment is complicated through inaccuracies in locationing means, such as GPS, which can exhibit error levels that make it infeasible to identify which lane a GPS signal was derived from based on individual GPS points or a vehicle trajectory. However, by considering location data from a plurality of probes, embodiments described herein can accurately infer lane properties to generate lane-level data.

According to an example embodiment, a probe apparatus 20 may provide (e.g., transmit) probe information/data to an apparatus 10. The probe information/data may comprise at least one of a probe identifier configured to identify the probe apparatus 20, a road segment identifier configured to identify the digital map road segment or link representing the road segment the probe apparatus 20 is travelling along, location information/data indicating a geophysical location of the probe apparatus 20 (e.g., determined by a location sensor 30), a travel speed of the probe apparatus 20 and/or the corresponding vehicle 5 travelling along at least a portion of the road segment, a timestamp, and/or the like.

A distance parameter for each instance of the plurality of instances of probe information/data may be determined. For example, the distance parameter d may be determined by determining the distance between (a) the location indicated by the location information/data of an instance of probe information/data and (b) a reference line of a road segment. In an example embodiment, the reference line of a road segment may be a center line of the road segment, a right hand edge of the road segment, a left hand edge of the road segment, and/or another reference line of the road segment. In an example embodiment, the distance parameter d may indicate a relative position of the location information/data relative to the road segment and/or the reference line.

Given the noisy nature of commercial locationing systems such as GPS, the probe data associated with the road segment may not clearly identify a lane of travel for the respective probe data points. As described further below, the overlapping nature of probe data points from adjacent lanes, the inaccuracies of location estimation, and the inherent spread of data points across the width of a road segment render lane-level data determination difficult.

Embodiments described herein use deconvolution techniques such as the Maximum Entropy Method to sharpen or pinpoint location data from a noisy location data, such as a noisy GPS signal location. Sensors and instruments used for establishing a location of a probe can experience atmospheric distortion, signal noise, or physical obstructions that cause the location data to be "blurred" or convoluted by a point spread function (PSF).

The Maximum Entropy Method of deconvolution is used in astronomy where instrument optics may cause blurring or warping of images of the sky through a point spread function. The point spread function affects the image in a manner known as convolution where the image of a point source, such as a distant star, is spread out to cover several pixels on the image sensor rather than a pin-point location of a single pixel at the actual location of the star in the image. Deconvolution is the inverse operation attempting to separate the undistorted truth from the point spread function and the digital image. A variety of deconvolution methods exist; however, embodiments described herein will focus primarily on the Maximum Entropy Method or Maximum Entropy Image Restoration.

The Maximum Entropy Method aims to obtain the most probable non-negative image consistent with the data, based on the number of ways in which such an image could have risen. In this manner, the Maximum Entropy Method models everything that is known and assumes nothing about what is unknown by choosing a model which is consistent with all of the facts, but otherwise is as uniform as possible. Entropy S is considered to be the amount of disorder, or lack of correlation in the data. Entropy and the related constraints are represented as:

$$S = -\sum_{i=0}^{N-1} p_i \log(p_i)$$

with constraints:

$$I_k = \sum_{i=0}^{N-1} p_i PSF_{k,i}$$

and $$\sum_{i=0}^{N-1} p_i = 1 \quad (1)$$

Where $p_i$ is the proportion of the total image brightness for a pixel (without any point spread function blurring). Typically these constraints do not provide a unique result themselves such that the principle of maximum entropy: Maximize (S) is used to obtain the restored image.

Through application of the Maximum Entropy Method to probe data in order to estimate lane properties, locationing mechanism (e.g., GPS) noise is modeled as a point spread function (PSF) describing how the located points are spread out around a probe device. Multiple vehicles/probes driving along a road segment in different lanes will cause the probe data from the vehicles to spread out and cover multiple lanes due to the noise from locationing devices such as consumer GPS devices or mobile phones, for example. As with the example embodiment described above for astronomical image discernment, the Maximum Entropy Method can be applied to a two-dimensional image which can be constructed by creating a two-dimensional grid covering an area of interest with small cells (e.g., 0.1 meter square or 0.3 meter square cells) and counting the number of probe points in each cell—which would correspond to the "brightness" of a pixel in the astronomical image embodiment. Optionally, the Maximum Entropy Method can be applied by creating a one-dimensional cross-section histogram of a road segment or portion thereof where the probe location points are map-matched to the road center and binned according to their measured distance from the road center map geometry (e.g., with 0.1 meter bin size).

FIGS. 4A-4D illustrate an example embodiment of probe data from a cross section of a road segment having three lanes. As vehicles traverse the lanes over time and probe data is accumulated, each lane will produce a histogram, such as Lane 1 shown in FIG. 4A, Lane 2 shown in FIG. 4B, and Lane 3 shown in FIG. 4C. While the histograms for each of Lane 1, 2, and 3 are shown separately in FIGS. 4A-4C, due to overlapping data points and the proximity of lanes to one another, the actual probe data from the three lanes is convoluted and intermingled to form a histogram through which lanes are not easily identified. The observed histogram of probe data points is the total data from the three lanes, shown in FIG. 4D with each histogram overlaid on the composite histogram of the outermost line of the plot. Using the Maximum Entropy Method of deconvolution, the original lane center offset distance for each of the three lanes can be reconstructed. In an ideal case, with a perfectly modeled point spread function, the result would include an impulse spike at each lane center, as shown in FIG. 5, where the height of the impulse spike is proportional to the relative traffic volume in each lane also known as the "mixture weight".

In real-world scenarios, the point spread function will not be ideal and the impulse spikes will spread out and form three narrow peaks rather than the impulse spikes of FIG. 5. FIG. 6A illustrates an example of a segment of road 100 including three lanes 102, 104, and 106 separated by lane lines 108. Probe data points 110 are received as raw location points, such as measured GPS location, and are distributed across the roadway 100. Only a portion of probe data points are shown along a section of the road segment 100 for ease of understanding. The measured histogram for the raw probe data 110 is illustrated in FIG. 7. As shown, the histogram does not clearly identify any individual lanes, but shows in this example a substantially Gaussian distribution of probe data about a centerline of the road segment. Applying the Maximum Entropy Method, as detailed further below, results in the histogram illustrated in FIG. 8, where the number of significant peaks in the resultant histogram (3) corresponds to the number of lanes in the data, and the peak location correlates with the location offset distances of the lanes with respect to the road center line to establish lane locations. The resultant data from the Maximum Entropy Method is overlaid on the road segment 100 illustrated in FIG. 6B, with lines 112, 114, and 116 representing the significant peaks in the histogram of FIG. 8 correlating with lanes 102, 104, and 106, respectively.

As described above, embodiments may apply the Maximum Entropy Method to either a two-dimensional spatial image or a one-dimensional cross-section histogram of a road segment to estimate lane properties. According to a two-dimensional implementation, the ground—as viewed from above—may be divided into a pixel grid where the intensity of each pixel is proportional to the number of probe data points whose reported location (e.g., the location data of the probe data point) corresponds with the respective grid cell/pixel. Applying a deconvolution method, such as the Maximum Entropy Method in the two-dimensional implementation yields explicit lane center geometry in the form of bright pixels corresponding to each lane center. An advantage of using the two-dimensional implementation is that detecting explicit lane center geometry may automatically capture the formation of new lanes and the disappearance of ending lanes, as the two-dimensional implementation gives an accurate representation of the road segment as viewed from above.

When applying the Maximum Entropy Method of deconvolution to a one-dimensional implementation, the probe data points are map-matched to the road center and the signed projection distance of each probe data point from the road center is used to create a road segment cross-section histogram for either the entire road segment or a section of the road segment by subdividing the segment. Optionally, a moving window along the road may be generated using a one-dimensional implementation which may mimic the two-dimensional implementation in terms of accuracy and lane-level data produced. A moving one-dimensional window along the road segment can capture the start of new lanes or the disappearance of lanes in a manner similar to that of the two-dimensional implementation. However, such a moving window technique relies on having accurate map-matching and road center geometry to map-match to.

Whether applying deconvolution methods to a probe data of a one-dimensional histogram or a two-dimensional pixel/cell grid, the overarching concept may be the same. Ignoring sensor noise, the measured two-dimensional pixel/cell grid image or one-dimensional histogram may be represented as:

$$\text{Measured Image} = \text{truth} * \text{PSF} \quad (2)$$

Where the (*) operator is the convolution operator. This equation expresses that the measured image is the convolution of truth with the point spread function (PSF). In applying this logic to a discrete image (pixel/cell grid) or histogram, equation (1) above can be expressed as the following for the one-dimensional histogram case:

$$I_k = \sum_{i=0}^{N-1} O_i PSF_{ki} \quad (3)$$

Where $I_k$ is the number of probes in bin k of the road cross-section histogram. $PSF_{ki}$ is the one-dimensional location noise model (e.g., a Gaussian model), but any Point spread Function model may be used. $O_i$ is the "truth" lane center offset bin position of the probe location (e.g., where the vehicle drove) in which we wish to reconstruct (i.e., $p_i$ in the entropy equation).

Extending the one-dimensional approach above to the two-dimensional approach can be expressed as:

$$I_{km} = \sum_{i=0}^{N-1} \sum_{j=0}^{M-1} O_{ij} PSF_{ki,mj} \quad (4)$$

This equation can be separated into the two directional components of the two-dimensional pixel/cell grid. $I_{km}$ is the number of probes in cell/pixel km of the area image. $PSF_{ki,mj}$ is the two-dimensional locationing (e.g., GPS) noise model (e.g., a Gaussian model), though any Point spread Function model may be used. $O_{ji}$ is the "truth" lane center offset bin position of the probe location (e.g., where the vehicle drove) in which we wish to reconstruct (i.e., $p_{ij}$ in the entropy equation).

FIG. 9A-9C illustrate different representations for point spread functions. FIG. 9A illustrates a two-dimensional point spread function as a three-dimensional surface. FIG. 9B illustrates an image or matrix (e.g., pixel grid) in two-dimensions. FIG. 9C illustrates a one-dimensional point spread function. The point spread function models the dispersion or distortion of a point source, such as a distant star captured in an image of the sky, or a GPS point captured from a probe traveling along a road segment in a network of roads. The point spread function models may have virtually any shape.

An objective of the embodiments described herein is to derive the "truth" lane location $O_i$ for the one-dimensional implementation and $O_{ij}$ for the two-dimensional implementation. Since the location data or GPS data for the probe data points are spread out around the vehicle associated with the probe, any one two-dimensional image pixel/cell or one-dimensional histogram bin only contains a partial signal from the vehicle/probe lane location and signals (i.e., probes) from all other vehicles traveling the same lane and other lanes as well (due to noise). Accordingly, Entropy S is defined in the one-dimensional implementation as:

$$S = -\sum_{i=0}^{N-1} p_i \log(p_i)$$

with constraints:

$$I_k = \sum_{i=0}^{N-1} p_i PSF_{k,i}$$

and $$\sum_{i=0}^{N-1} p_i = 1 \quad (5)$$

Where $p_i$ are the proportions of the total histogram image brightness for the lane offset bin we wish to identify (e.g., by removing the effect of any point spread function blurring). The two constraints express that the total energy I of the system and the total number of particles (probes) are fixed.

According to the two-dimensional implementation, Entropy S is defined as:

$$S = -\sum_{i=0}^{N-1} \sum_{j=0}^{M-1} p_{ij} \log(p_{ij}) \text{ with constraints} \quad (6)$$

with constraints:

$$I_{km} = \sum_{i=0}^{N-1} \sum_{j=0}^{M-1} p_{ij} PSF_{ki,mj}$$

and $$\sum_{i=0}^{N-1} \sum_{j=0}^{M-1} p_{ij} = 1$$

Where $p_{ij}$ is the proportion or probabilities of the total image brightness for the lane center pixel/cell that we wish to identify (e.g., removing the effect of any point spread function blurring). The two constraints are equivalent to the one-dimensional implementation To derive the solution—peaks for the lane center histogram offset bin $p_i$ in the one-dimensional implementation and the lane center pixel/cell location $p_{ij}$ in the two-dimensional case—we need to maximize the multi-variate function S subject to the constraints listed. This can be accomplished by introducing Lagrange multipliers and recasting the problem of determining the Lagrange multipliers as a variational problem by introducing trial Lagrange multipliers. Importantly, the introduction of a "potential function" F, which is concave for any trial set of Lagrange multipliers. The values of the multipliers are determined as the best which minimizes F.

In general, a function $f(x_0, x_1, x_2, \ldots)$ with constraints $g_1(x_0, x_1, x_2, \ldots) = 0, g_2(x_0, x_1, x_2, \ldots) = 0, \ldots$, is maximized by introducing a new function $\mathcal{L}((x_0, x_1, x_2, \ldots), \lambda)$:

$$\mathcal{L}((x_0, x_1, x_2, \ldots), \lambda) = f(x_0, x_1, x_2, \ldots) + \lambda_1 g_1(x_0, x_1, x_2, \ldots) + \lambda_2 g_2(x_0, x_1, x_2, \ldots) + \lambda_3 g_3(x_0, x_1, x_2, \ldots) + \ldots \quad (8)$$

where the $\lambda$'s are the Lagrange multipliers. $f$ is maximized by setting the derivatives to zero:

$$\frac{\partial L}{\partial x_i} = 0 \text{ and } \frac{\partial L}{\partial \lambda_i} = 0 \text{ for all } i \quad (9)$$

The process described herein may be applied to the one-dimensional implementation or the two-dimensional implementation. Further, example embodiments may be applied to three or four dimensional implementations, as described further below.

Example Implementation

In order to determine lane properties from probe data as described above, the process may be implemented by modeling the location data (e.g., GPS) point spread function for a local geographical area. According an example described herein, a Gaussian point spread function may be used with a zero mean, $\sigma=2.5$ meters, and extent/limits of $\pm 3\sigma$. If the local point spread function is unknown, it can be iteratively estimated using roads for which the number of lanes is known. Optionally, there are variants of Maximum Entropy Method that can be applied to unknown point spread functions, also known as blind deconvolution.

For each road segment or link, a histogram of the probe data may be generated with respect to the road center. This may be accomplished by map-matching the probe data points to the road center line geometry and recording the signed distance (e.g., positive values on the right-hand side, negative values on the left-hand side) map-matching distance to the road center geometry, and record the minimum and maximum map-matching distances. The histogram range (i.e., max-min map-matching distance) may be divided into bins based on the chosen bin size (e.g., 0.1 meter). As shown in FIG. 10, a road segment 200 may include a plurality of probe data points 210 from vehicles having traveled along the road segment, and the probe data points are assigned a projection distance according to their distance from the road centerline 205 measured at the closest possible distance or perpendicular to the centerline 205.

Bins for each cell of the two-dimensional grid or for each distance from the centerline in one-dimensional histogram are initialized to zero, and for each probe data point, the map-matched distance $d_i$ to the centerline 205 is assigned to the corresponding histogram bin, $b_k$ and the bin value is incremented by one for each probe data point assigned to the bin. The histogram generated from the probe data point cloud of FIG. 10 may resemble the histogram of FIG. 7, with no discernable lanes. However, using deconvolution such as the Maximum Entropy Method, the histogram of FIG. 7 resembles the histogram of FIG. 8, where lanes are more discernable.

In order to determine the lane geometry, the major or statistically significant peaks of the deconvolved histogram may be identified and classified. As shown in FIG. 8, there are three major, statistically significant peaks 310, one for each lane center. However, this solution is not exact due to imperfect point spread function definitions, histogram irregularities (e.g., caused by probe density variations along the link and map matching anomalies or poor road center geometry definition). As such, small "ghost" peaks or peaks that are not statistically significant may be present, such as peaks 320. To accurately and automatically identify the true lanes identified through the deconvoluted histogram, robust statistics may be applied to identify the statistically significant peaks. Further, additional constraints may be introduced to increase the accuracy of true lane identification. Constraints may include a peak lane separation (or minimum separation) since lane center separation distances are typically constrained by road design rules, such as 2.7-3.6 meters in the US, and 2.5-3.25 meters in Europe.

According to some embodiments, a non-parametric feature-space analysis technique for locating the maxima of a density function may be used to identify peaks. This Mean Shift analysis technique uses multiple seeds (i.e., starting locations) so the road cross section is seeded frequently, such as every one meter, and a bandwidth may be used of about 2 to 3 meters. Further, the Mean Shift technique may be used to cluster the peaks with a cluster distance of about 2 meters. The exact choices of mean shift parameters may not be critical. However, expected feature separation distances (e.g., 2 to 4 meters) may be taken into consideration. The seed separation should be much smaller than the expected feature separation distances. From these methods, only the statistically significant peaks (e.g., peaks 310 of FIG. 8) are retained.

Once the number of lanes of a road segment has been identified, lane properties may be determined. The number of lanes or lane count corresponds to the number of statistically significant peaks in the deconvoluted histogram, as detailed above. Lane center distance with respect to the road center may be computed from the location of the significant peak(s) with respect to the road center. For example, −3.64 meters, 1.17 meters, and 6.77 meters, according to an example embodiment. The mixture or the relative traffic volume in each lane can be estimated from the relative volume in each peak with respect to the total volume of all statistically significant peaks. Lane markings such as lane lines may be identified or derived (when lane count is greater than one) by identifying the location of the troughs between the statistically significant peaks and assuming the outer paint stripes are half a lane width from the outer lane centers. Lane center geometry can be created by offsetting the road center according to the lane center offsets.

As noted above, sub-dividing a road segment into multiple sections can allow the one-dimensional implementation to detect lane changes within a road segment. Alternatively, a moving window to detect lane count changes may be implemented. In the two-dimensional case, the lane geometry may be explicitly derived, even for complex shapes such as ramps, round abouts, intersections, etc., and no moving window or sub-division techniques are needed.

For the two-dimensional case, the point spread function may be determined in two dimensions, as in FIGS. 9A and 9B. The area may be divided into a grid, where each grid cell is a histogram accumulator similar to an image. Using the Maximum Entropy Method, the deconvoluted image may be obtained. Lane center locations may correspond to the cell peaks (or pixels with high intensity) and can be identified with robust statistics or image processing techniques.

The above-described embodiments includes a one-dimensional approach in which probe data points that are map-matched to a road segment are gathered along a length of the segment or along a sub-section of the segment and binned (e.g., in bins of 0.1 meters) according to their respective distances from the road segment centerline (defined in the map data) along the road segment or sub-section thereof. The binned data forms a histogram as shown in FIG. 7 which can be deconvoluted as described above. Similarly, a two-dimensional approach may be used in which probe data points that are map-matched to a road segment are binned to a two-dimensional grid that is overlaid on the road segment, where the bins or cells, where each cell has a value according to the number of probe data points that fall within that bin/cell on the road segment. This produces a more accurate distribution of probe data along the road segment as it is less dependent upon an accurate road centerline defined in a map database. Similar deconvolution techniques may be applied as described above to obtain accurate lane-level geometry and traffic data.

A two-dimensional implementation or possibly a one-dimensional implementation with a moving window of data points that approximates the two-dimensional implementation may also be capable of determining lane-level geometries of roadway anomalies and intersections. For example, using the two-dimensional approach, if probe data is gathered for an intersection, turn-lane formation and traffic patterns through the intersection may be established using the two-dimensional grid overlay, which may establish lane-level geometry and traffic data for an intersection. Further, turn-offs of a road segment for businesses, parking garages, or other points-of-interest may be discernable using the two-dimensional approach as probe data points will cluster at the turn-offs and through a turn maneuver, which would be discerned through the two-dimensional grid overlay of the road segment. The two-dimensional embodiment may also be capable of establishing merge lane start/finish and other lane-level details not necessarily discernable through a one-dimensional approach.

While embodiments described above include one- and two-dimensional embodiments, examples may further include three- and four-dimensional embodiments. A three-dimensional implementation may be similar to a two-dimensional embodiment, but may add an elevation component to the data. For example, while the two-dimensional embodiment overlays a grid of cells on a road segment, a three-dimensional embodiment may overlay a three-dimensional matrix of cells on a road segment. Such an embodiment may be able to establish and distinguish lane-level data from roads crossing others at different elevations, such as at overpasses. Using the elevation dimension the probe data crossing each other at different elevations would not adversely affect or cloud the probe data from the other road segment. This may enable accurate lane-level geometry and traffic data to be modeled at complex interchanges with various elevations of roadways. Further, the three-dimensional approach may be useful in lane-level geometry and traffic data modeling of parking garages or any structure or road where probe data may exist at multiple elevations.

A fourth-dimension may optionally be used in example embodiments, and may be combinable with any one of the first-, second-, or third-dimension embodiments. The fourth-dimension may include time, such that periods of time are considered in establishing lane-level geometry and traffic data. A temporal component may be readily implemented with probe data including a timestamp or probe data gathered in real-time and assigned a timestamp when received. The temporal component included with embodiments described herein can establish changes in lane-level geometry and traffic data/information based on a time of day, day of week, season of the year, special event, etc. Using time as a factor, lane-level data may be determined for when lanes are available at only certain times of day, such as reversible express lanes that change direction based on time of day and day of week. A spatiotemporal cell-density image may be generated from the probe data with a dimension of the image in the time domain representing different periods of time Further, the time component may also be able to discern hours of operation of businesses based on the traffic patterns turning off of a road segment into a business or other point-of-interest.

Implementations of Lane-Level Geometry and Traffic Information/Data

Once lane-level geometry and traffic information/data for one or more lanes of the road segment are determined, lane-level geometry and traffic information/data notification may be provided to one or more computing entities 35. In an example embodiment, the lane-level traffic information/data notification may comprise at least a portion of the determined lane-level traffic information/data. In an example embodiment, the lane-level traffic information/data notification may include a map revision such as an updated map tile for replacing a map tile in a digital map database or geographic database 21, a traffic information/data map tile layer, and/or the like. The digital map database or geographic database 21 may be part of one or more computing entities 35 or may be separate therefrom as shown in FIG. 1. According to some embodiments, the geographic database 21 may be maintained by a map data service provider and accessible via a network 40. A computing entity 35 may be a probe apparatus 20 (e.g., corresponding to a vehicle 5 that is approaching the road segment, expected to travel along the road segment on a current trip or an expected trip, currently travelling along the road segment, and/or the like) or a traffic management apparatus. For example, the computing entity 35 may be a traffic management apparatus that is operated by and/or on behalf of a traffic management agency (e.g., a local department of transportation, city traffic management office, and/or the like). In example embodiments, the lane-level geometry and traffic information/data may comprise computer-executable code and/or reference computer-executable code that, when executed by the computing entity 35 may cause the computing entity 35 to provide one or more lane-level alerts through a user interface thereof (e.g., a display, audible alert, and/or the like). For example, the speed of traffic in a first lane may be considerably slower than the traffic in a second or third lane at a location a short distance ahead of the vehicle's 5 current location. Thus, a lane-level alert may be provided indicating that the speed of traffic in first lane is considerably slower than the traffic in the second and third lanes ahead. Various lane-level alerts may be provided, as appropriate for the application. In an example embodiment, the computing entity 35 may, responsive to receiving the lane-level geometry and traffic information/data notification and/or in response to executing the computer-executable therein and/ or referenced thereby, perform one or more lane-level navigation tasks based on the lane-level traffic information/data. For example, one or more route planning computations, determinations, and/or the like may be performed that take into account the lane-level traffic information/data and provide lane-level directions and/or determinations for the route. For example, a route planning computation, determination, and/or the like may comprise re-calculating a route, determining an updated travel and/or expected arrival time, and/or the like.

According to an example embodiment, lane-level traffic information may be established using lane data discerned from the probe data using the aforementioned deconvolution techniques. An apparatus 10 may be used to determine and/or provide lane-level traffic information/data. In an example embodiment, the lane-level traffic information/data may be used to perform lane-level navigation. Lane-level traffic information/data may comprise a lane specific representative travel speed (e.g., an average travel speed) for one or more lanes of the road segment, a lane specific distribution description (e.g., standard deviation) of travel speed, a lane specific traffic volume measurement, lane specific alerts, lane specific traffic jam information/data, and/or the like for one or more lanes of the road segment. Lane-level traffic volume data for a road segment or portion thereof may be established in response to aggregation of the probe data that is processed as described above over a predetermined period of time. In an example embodiment, lane-level traffic information/data may comprise information/data indicating the current lane a particular vehicle 5 is traveling in (e.g., as of the last instance of probe information/data provided by the probe apparatus 20 onboard the particular vehicle 5). In an example embodiment, lane-level traffic information/data may be determined using historical probe information/data collected over a predetermined window of time.

For example, the apparatus 10 may determine a vehicle lane pattern for the road segment as described above using the Maximum Entropy Method. For example, the apparatus 10 may comprise means, such as the processor 12 and/or the like, for determining a vehicle lane pattern for the road segment. In an example embodiment, the vehicle lane pattern may be determined based on historical probe information/data that is map-matched and deconvoluted. In example embodiments, a vehicle lane pattern may comprise information regarding the number of lanes along the road segment, a lane identifier for each lane of the road segment, a representative distance parameter (e.g., mean, mode, median, average, and/or the like) for the road segment, a distribution description describing the distribution of distance parameters of vehicles traveling in the lane (e.g., a standard deviation of distance parameters of vehicles traveling in the lane, and/or the like), a width of the lane, a representative speed for the lane (e.g., mean, mode, median, average, free flow, and/or the like), a distribution description describing the distribution of speeds (e.g., standard deviation and/or the like), a day and/or time period for which the vehicle lane pattern is relevant, and/or the like. In an example embodiment, the vehicle lane pattern is established based on historical probe information/data. For example, the vehicle lane pattern may be established based on one, two, three, four, and/or the like days of historical probe information/data. In an example embodiment, the vehicle lane period may correspond to a particular day (or days) and time. For example, a vehicle lane pattern may correspond to and/or be relevant to traffic on Monday, Tuesday, Wednesday, and Thursdays from 5 to 5:30 pm. In another example, a vehicle lane pattern may correspond and/or be relevant to traffic on Saturdays from 1 to 3 pm. For example, if a road segment comprises a reversible lane, a shoulder lane, and/or the like that is only in use during a particular time period and/or on particular days, a vehicle lane pattern corresponding to road segment may be relevant to a particular day of the week and/or time of day. In example embodiments, a distance parameter may indicate the distance from a reference line of the road segment to position on a road segment indicated by the location information/data provided by an instance of probe information/data. Additional information/data regarding the distance parameter and determination thereof is provided elsewhere herein.

Example Apparatus

The probe apparatus 20, computing entity 35, and/or apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the probe apparatus 20, computing entity 35, and/or apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2 depicts an apparatus 10 and FIG. 3 depicts a probe apparatus 20 of an example embodiment that may be embodied by various computing devices including those identified above. As shown, the apparatus 10 of an example embodiment may include, may be associated with or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22, and a memory device 24, and optionally a communication interface 26, a user interface 28, one or more sensors 30 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 35 may, similar to the apparatus 10 and/or probe apparatus 20, comprise a processor, memory device, communication interface, user interface, and/or one or more additional components configured to perform various operations, procedures, functions, or the like described herein. In an example embodiment, a computing entity may comprise one or more sensors similar to the one or more sensors 30.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories.

In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a road segment/link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10, computing entity 35, and/or probe apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The apparatus 10, computing entity 35, and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10, computing entity 35, and/or probe apparatus 20 of an example embodiment, a navigation system may also include or have access to a geographic database 21 that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database 21 may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 and/or computing entity 35 may be configured to execute computer-executable instructions provided by and/or referred to by a data record. In an example embodiment, the apparatus 10 may be configured to modify, update, and/or the like one or more data records of the geographic database 21.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database 21 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 21 can include data about the POIs and their respective locations in the POI data records. The geographic database 21 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database 21 can include and/or be associated with event data (e.g., traffic incidents, constructions, scheduled events, unscheduled events, etc.) associated with the POI data records or other records of the geographic database.

The geographic database 21 can be maintained by the content provider (e.g., a map developer) in association with the services platform. By way of example, the map developer can collect geographic data to generate and enhance the geographic database 21. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database 21 may be updated based on information/data provided by one or more probe apparatuses.

The geographic database 21 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10, computing entity 35, and/or probe apparatus 20 in accordance with an example embodiment may determine the time to traverse a route that includes one or more turns at respective intersections more accurately.

FIG. 11 illustrates a flowchart of a method for establishing lane-level data from probe data points according to an example embodiment of the present invention. As shown at 400, probe data points are received that are associated with a plurality of vehicles. Each probe data point received from a probe apparatus may be from a probe apparatus having one or more sensors and being onboard or otherwise associated with a respective vehicle. Each probe data point may include location information associated with the probe apparatus. A location and a road segment associated with the location of the probe data points is determined at 410. A probe density histogram for the first road segment may be generated at 420, where the probe density histogram may represent a volume of probe data points at each of a plurality of positions across a width of the first road segment. A deconvolution method may be applied to the probe density histogram at 430. This deconvolution method may be, for example, a Maximum Entropy Method. From the deconvoluted, refined probe density histogram, a number of statistically significant peaks may be determined as shown at 440. At 450, lane level properties of the probe data of the first road segment may be established based on the determined lane-specific probe data points. At 460, navigational assistance and/or at least partially autonomous vehicle control may be provided based on the computed lane level properties of 450.

FIG. 12 illustrates another flowchart of another method for establishing lane-level data from probe data points according to an example embodiment of the present invention. Probe data points associated with a plurality of vehicles may be received at 500, and a location and road segment associated with the probe data points may be determined at 510. A cell-density image may be generated from the probe data points associated with a first road segment at 520. A deconvolution method may be applied to the cell-density image to obtain a refined cell-density image at 530. Based on the refined cell-density image, at 540, a number of paths within the refined cell-density image may be determined, where each path represents a lane of a roadway represented by the cell-density image. Lane-level properties of the probe data of the first road segment may be computed at 550 based on the alignment of probe data points within individual lanes as determined in 540. Navigational assistance and/or at least semi-autonomous vehicle control may be provided at 560 based on the computed lane-level properties.

As described above, FIGS. 11 and 12 illustrate flowcharts of apparatuses 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 11 or 12 above may comprise a processor (e.g., the processor 12) configured to perform some or each of the operations (400-460 and/or 500-560) described above. The processor may, for example, be configured to perform the operations (400-460 and/or 500-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-460 and/or 500-560 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A mapping system comprising:
a memory comprising map data; and
processing circuitry configured to:
receive probe data points associated with a plurality of vehicles, each probe data point received from a probe apparatus of a plurality of probe apparatuses, each probe apparatus comprising one or more sensors and being onboard a respective vehicle, wherein each probe data point comprises location information associated with the respective probe apparatus;
for each of the probe data points, determine a location and a road segment corresponding to the location;
generate, from the probe data points associated with a first road segment, a probe density histogram for the first road segment, wherein the probe density histogram represents a volume of probe data points at each of a plurality of positions across a width of the first road segment;
apply a deconvolution method to the probe density histogram to obtain a multi-modal histogram;
determine, from the multi-modal histogram, a number of statistically significant peaks, wherein each statistically significant peak represents a lane of the first road segment;
compute, from the multi-modal histogram, lane-level properties of the probe data of the first road segment; and
provide data for at least one of navigational assistance or at least semi-autonomous vehicle control based on the computed lane-level properties of the probe data of the first road segment.

2. The mapping system of claim 1, wherein the processing circuitry configured to compute, from the multi-modal histogram, lane-level properties of the probe data of the first road segment comprises processing circuitry configured to:
determine, from the multi-modal histogram, a distance of each statistically significant peak from the first road segment centerline.

3. The mapping system of claim 2, wherein the processing circuitry configured to compute, from the multi-modal histogram, lane-level properties of the probe data of the first road segment comprises processing circuitry further configured to:
generate digital map data having a number of road segment lanes corresponding to the number of statistically significant peaks at positions corresponding to the distance of each statistically significant peak from the road segment centerline; and
provide for at least semi-autonomous vehicle control or navigation assistance using the generated digital map data.

4. The mapping system of claim 1, wherein the processing circuitry configured to generate a probe density histogram for the first road segment representing a volume of probe data points at each of a plurality of positions across a width of the road segment comprises processing circuitry configured to:
 sub-divide a width of the first road segment into a plurality of bins according to a chosen bin size;
 bin each probe data point to a respective one of the plurality of bins corresponding to a distance of the respective probe data point from a centerline of the road segment; and
 generate the probe density histogram based on a volume of probe data points in each bin across a width of the road segment.

5. The mapping system of claim 1, wherein the deconvolution method comprises a Maximum Entropy Method.

6. The mapping system of claim 1, wherein the processing circuitry configured to apply a deconvolution method to the probe density histogram to obtain a multi-modal histogram comprises processing circuitry configured to:
 model location error of the probe data points associated with the first road segment using a point spread function;
 apply the deconvolution method to the probe density histogram using the point spread function; and
 generate the multi-modal histogram for the first road segment.

7. The mapping system of claim 1, wherein the processing circuitry configured to determine, from the multi-modal histogram, a number of statistically significant peaks, wherein each statistically significant peak represents a lane of the first road segment; comprises processing circuitry configured to:
 identify a lane of the first road segment in response to a corresponding statistically significant peak being within a range of 2.5 meters to 3.6 meters of another statistically significant peak.

8. The mapping system of claim 1, wherein the processing circuitry configured to, for each of the probe data points, determine a location and a road segment corresponding to the location comprises processing circuitry configured to:
 map-match the probe data points to the first road segment;
 sub-divide the road segment into a plurality of sub-segments; and
 associate each of the probe data points map-matched to the first road segment to one of the plurality of sub-segments, wherein the processing circuitry configured to generate, from the probe data points associated with a first road segment, a probe density histogram for the first road segment comprises processing circuitry configured to:
 generate, from the probe data points associated with a first road segment, a probe density histogram for each of the sub-segments of the first road segment.

9. A computer program product comprising at least one non-transitory computer-readable storage medium having computer-executable program code instructions stored therein, the computer-executable program code instructions comprising program code instructions to:
 receive probe data points associated with a plurality of vehicles, each probe data point received from a probe apparatus of a plurality of probe apparatuses, each probe apparatus comprising one or more sensors and being onboard a respective vehicle, wherein each probe data point comprises location information associated with the respective probe apparatus;
 for each of the probe data points, determine a location and a road segment corresponding to the location;
 generate, from the probe data points associated with a first road segment, a probe density histogram for the first road segment, wherein the probe density histogram represents a volume of probe data points at each of a plurality of positions across a width of the first road segment;
 apply a deconvolution method to the probe density histogram to obtain a multi-modal histogram;
 determine, from the multi-modal histogram, a number of statistically significant peaks, wherein each statistically significant peak represents a lane of the first road segment;
 compute, from the multi-modal histogram, lane-level properties of the probe data of the first road segment; and
 store the computed lane-level properties of the probe data of the first road segment to augment a geographic database.

10. The computer program product of claim 9, wherein the program code instructions to compute, from the multi-modal histogram, lane-level properties of the probe data of the first road segment comprises program code instructions to:
 determine, from the multi-modal histogram, a distance of each statistically significant peak from the first road segment centerline.

11. The computer program product of claim 10, wherein the program code instructions to compute, from the multi-modal histogram, lane-level properties of the probe data of the first road segment comprises program code instructions to:
 generate digital map data having a number of road segment lanes corresponding to the number of statistically significant peaks at positions corresponding to the distance of each statistically significant peak from the road segment centerline; and
 provide for at least semi-autonomous vehicle control or navigation assistance using the generated digital map data.

12. The computer program product of claim 9, wherein the program code instructions to generate a probe density histogram for the first road segment representing a volume of probe data points at each of a plurality of positions across a width of the road segment comprises program code instructions to:
 sub-divide a width of the first road segment into a plurality of bins according to a chosen bin size;
 bin each probe data point to a respective one of the plurality of bins corresponding to a distance of the respective probe data point from a centerline of the road segment; and
 generate the probe density histogram based on a volume of probe data points in each bin across a width of the road segment.

13. The computer program product of claim 9, wherein the deconvolution method comprises a Maximum Entropy Method.

14. The computer program product of claim 9, wherein the program code instructions to apply a deconvolution method to the probe density histogram to obtain a multi-modal histogram comprises program code instructions to:
 model location error of the probe data points associated with the first road segment point spread function using a point spread function;

apply the deconvolution method to the probe density histogram using the point spread function; and generate the multi-modal histogram for the first road segment.

15. The computer program product of claim 9, wherein the program code instructions to determine, from the multi-modal histogram, a number of statistically significant peaks, wherein each statistically significant peak represents a lane of the first road segment; comprises program code instructions to:

identify a lane of the first road segment in response to a corresponding statistically significant peak being within a range of 2.5 meters to 3.6 meters of another statistically significant peak.

16. The computer program product of claim 9, wherein the program code instructions to, for each of the probe data points, determine a location and a road segment corresponding to the location comprises program code instructions to:

map-match the probe data points to the first road segment;

sub-divide the road segment into a plurality of sub-segments; and associate each of the probe data points map-matched to the first road segment to one of the plurality of sub-segments, wherein the program code instructions to generate, from the probe data points associated with a first road segment, a probe density histogram for the first road segment comprises causing the apparatus to:

generate, from the probe data points associated with a first road segment, a probe density histogram for each of the sub-segments of the first road segment.

17. A method for establishing lane-level data from probe data comprising:

receiving probe data points associated with a plurality of vehicles, each probe data point received from a probe apparatus of a plurality of probe apparatuses, each probe apparatus comprising one or more sensors and being onboard a respective vehicle, wherein each probe data point comprises location information associated with the respective probe apparatus;

for each of the probe data points, determining a location and a road segment corresponding to the location;

generating, from the probe data points associated with a first road segment, a probe density histogram for the first road segment, wherein the probe density histogram represents a volume of probe data points at each of a plurality of positions across a width of the first road segment;

applying a deconvolution method to the probe density histogram to obtain a multi-modal histogram;

determining, from the multi-modal histogram, a number of statistically significant peaks, wherein each statistically significant peak represents a lane of the first road segment;

computing, from the multi-modal histogram, lane-level properties of the probe data of the first road segment; and providing data for at least one of navigational assistance or at least semi-autonomous vehicle control based on the computed lane-level properties of the probe data of the first road segment.

18. The method of claim 17, wherein computing, from the multi-modal histogram, lane-level properties of the probe data of the first road segment comprises:

determining, from the multi-modal histogram, a distance of each statistically significant peak from the first road segment centerline.

19. The method of claim 18, wherein computing, from the multi-modal histogram, lane-level properties of the probe data of the first road segment comprises:

generating digital map data having a number of road segment lanes corresponding to the number of statistically significant peaks at positions corresponding to the distance of each statistically significant peak from the road segment centerline; and providing for at least semi-autonomous vehicle control or navigation assistance using the generated digital map data.

20. The method of claim 17, wherein generating a probe density histogram for the first road segment representing a volume of probe data points at each of a plurality of positions across a width of the road segment comprises:

sub-dividing a width of the first road segment into a plurality of bins according to a chosen bin size;

binning each probe data point to a respective one of the plurality of bins corresponding to a distance of the respective probe data point from a centerline of the road segment; and generating the probe density histogram based on a volume of probe data points in each bin across a width of the road segment.

* * * * *